(12) United States Patent
Mochinushi et al.

(10) Patent No.: US 7,587,134 B2
(45) Date of Patent: Sep. 8, 2009

(54) CAMERA HAVING BARRIER

(75) Inventors: Hidenobu Mochinushi, Hachioji (JP);
Kosaku Nishio, Kiyose (JP); Moriya Katagiri, Tokyo (JP); Satoru Yasutomi, Hachioji (JP); Nobuyuki Tanaka, Hachioji (JP); Naoki Matsumoto, Hachioji (JP); Yasunari Shimazaki, Hino (JP)

(73) Assignee: Olympus Imaging Corp., Tokyo (JP)

( * ) Notice: Subject to any disclaimer, the term of this patent is extended or adjusted under 35 U.S.C. 154(b) by 135 days.

(21) Appl. No.: 11/285,369

(22) Filed: Nov. 22, 2005

(65) Prior Publication Data

US 2006/0115249 A1    Jun. 1, 2006

(30) Foreign Application Priority Data

Nov. 26, 2004  (JP) ............................. 2004-343140
Nov. 26, 2004  (JP) ............................. 2004-343141
Nov. 26, 2004  (JP) ............................. 2004-343142

(51) Int. Cl.
*G03B 17/08* (2006.01)
*H04N 9/47* (2006.01)

(52) U.S. Cl. ........................... 396/29; 396/75; 396/448; 348/81

(58) Field of Classification Search .................. 396/25, 396/27–29, 73, 75, 448; 348/81
See application file for complete search history.

(56) References Cited

U.S. PATENT DOCUMENTS 5,066,965 A * 11/1991 Tanaka et al. .................. 396/29

(Continued)

FOREIGN PATENT DOCUMENTS

CN            1479158 A        3/2004

(Continued)

OTHER PUBLICATIONS

Chinese Office Action dated Jan. 25, 2008 issued in counterpart Chinese application No. 2005101243478.

(Continued)

*Primary Examiner*—Rochelle-Ann J Blackman
(74) *Attorney, Agent, or Firm*—Frishauf, Holtz, Goodman & Chick, P.C.

(57) ABSTRACT

A camera having a barrier according to the present invention includes a barrier unit in a space between a front main body and a front metal cover serving as an exterior member. Rotation of a barrier driving motor is transmitted to a rotary shaft member passing through the front main body, thereby allowing opening/closing actions of the lens barrier between a protection position for a photographing lens and a lens-barrier retracted position. The front main body is sealed waterproof by an O-ring provided to the outer circumferential surface of the rotary shaft member. With the lens barrel of the camera, rotation of a rotary moving frame is effectively transmitted to a cam frame through a cam follower fit to a linear-action groove, using a circumferential groove and the linear-action groove of a bayonet mechanism.

10 Claims, 17 Drawing Sheets

U.S. PATENT DOCUMENTS

| | | | |
|---|---|---|---|
| 5,739,962 A * | 4/1998 | Asakura et al. | 359/700 |
| 5,946,501 A * | 8/1999 | Hayakawa | 396/25 |
| 6,038,087 A * | 3/2000 | Suzuki et al. | 359/819 |
| 6,254,289 B1 * | 7/2001 | Manabe et al. | 396/448 |
| 6,640,053 B1 * | 10/2003 | Dirisio | 396/29 |
| 2004/0042784 A1 | 3/2004 | Oh et al. | |

FOREIGN PATENT DOCUMENTS

| | | |
|---|---|---|
| JP | 6-201966 A | 7/1994 |
| JP | 10-160994 A | 6/1998 |
| JP | 2002-072288 A | 3/2002 |
| JP | 2003-255212 A | 9/2003 |

OTHER PUBLICATIONS

English translation of Chinese Office Action (First Notice Proper of Examiner's Reasons for Rejection) dated Jan. 25, 2008, issued in a counterpart Chinese Application.

Chinese Office Action dated Oct. 10, 2008 issued in a counterpart Chinese Application.

* cited by examiner

CAMERA HAVING BARRIER

This application claims benefit of Japanese Applications No. 2004-343140 filed in Japan on Nov. 26, 2004, No. 2004-343141 filed in Japan on Nov. 26, 2004, and No. 2004-343142 filed in Japan on Nov. 26, 2004, the contents of which are incorporated by this reference.

BACKGROUND OF THE INVENTION

1. Field of the Invention

The present invention relates to a camera including a barrier having a function for movement thereof between the lens-barrier retracted position where the barrier is to be retracted from the front face of a photographing lens and the protection position facing the front of the aforementioned photographing lens.

2. Description of the Related Art

Japanese Unexamined Patent Application Publication No. 2002-72288 discloses a lens barrier unit employed in a conventional camera with a barrier having a configuration in which the face of the lens barrier and the face of the camera body form a single surface when the lens barrier is in the closed position. The aforementioned lens barrier unit has a configuration in which one end of the barrier in the sliding direction is held by a link member that is a component of a toggle mechanism, and the other end is held by a cam groove through a cam follower. With such a configuration, the barrier is moved up to the face of the camera body at the barrier closed position by actions of the aforementioned cam groove and link member so that the face of the lens barrier and the face of the camera body form a single surface. A dedicated stepping motor is employed as a driving source of the lens barrier unit.

On the other hand, with a lens barrel including a frame member connected by a bayonet mechanism disclosed in Japanese Unexamined Patent Application Publication No. 2003-255212, such a lens barrel allows compact design and enables driving of the lens barrel forward and backward in a sure manner. With the lens barrel, a linear-action guide member is connected to a cam frame having a structure which allows rotation thereof and forward/backward movement thereof, by the bayonet mechanism. Upon rotating and moving forward/backward the aforementioned cam frame, the aforementioned linear-action guide member is moved forward/backward in the axial direction along with the cam frame without rotation thereof.

Furthermore, Japanese Unexamined Patent Application Publication No. 6-201966 discloses a flare preventing mechanism of a zoom lens barrel including a flare preventing movable shield therewithin. The movable shield is formed of a non-flexible shield. With the flare preventing mechanism, while the movable shield is moved forward/backward integrally with the moving frame (movable frame) in a certain zoom region, the movable shield is held and fixed in the other zoom region.

Furthermore, Japanese Unexamined Patent Application Publication No. 10-160994 discloses a flare diaphragm unit employing a flexible flare diaphragm. With the flare diaphragm unit, in a case that the movable frame is retracted to come in contact with the flare diaphragm, the flare diaphragm changes the shape thereof to allow the movement of the movable frame.

SUMMARY OF THE INVENTION

A camera having a barrier according to the present invention includes a lens barrier having a mechanism for movement thereof between a lens-barrier retracted position where the barrier is retracted from the front of a photographing lens and a protection position facing the front of the photographing lens. The camera according to the present invention has the advantage of a small space occupied by a waterproof mechanism, thereby-enabling design of a small-size camera.

A camera having a barrier according to the present invention comprises: a frame member having a waterproof mechanism for the inside; a driving source stored inside of the frame member; an outside transmission member for transmitting driving force of the driving source to the outside of the frame member; a through portion provided to the frame member which allows the outside transmission member to pass through the frame member; a seal member for keeping connection between the through portion and the outside transmission member waterproof; a lens barrier which is provided outside of the frame member, and which is driven by the driving source so as to move between a lens-barrier retracted position where the lens barrier is retracted from the front of a photographing lens and a protection position facing the front of the photographing lens; and a driving mechanism which is provided outside of the frame member, and which has a function for driving the lens barrier between the lens-barrier retracted position and the protection position by driving force received from the outside transmission member.

Other features and advantages of the present invention will become apparent from the following description.

DETAILED DESCRIPTION OF THE PREFERRED EMBODIMENTS

Description will be made below regarding embodiments according to the present invention with reference to the drawings.

Figure 1:
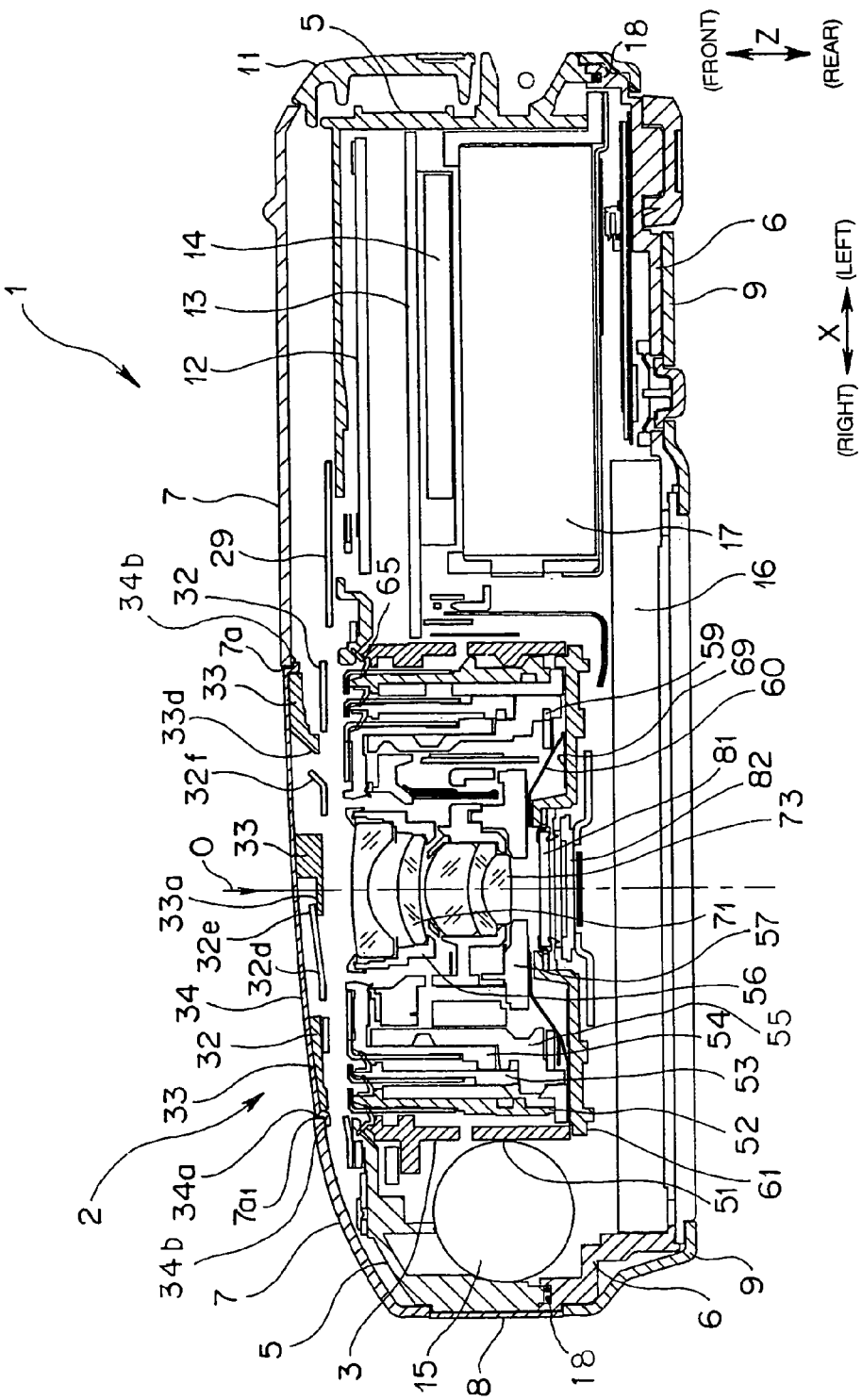
FIG. 1 is a horizontal sectional view which shows a camera having a barrier in the state in which the barrier is closed and a lens barrel is collapsed, through a plane including the optical axis, according to an embodiment of the present invention.
Figure 2:
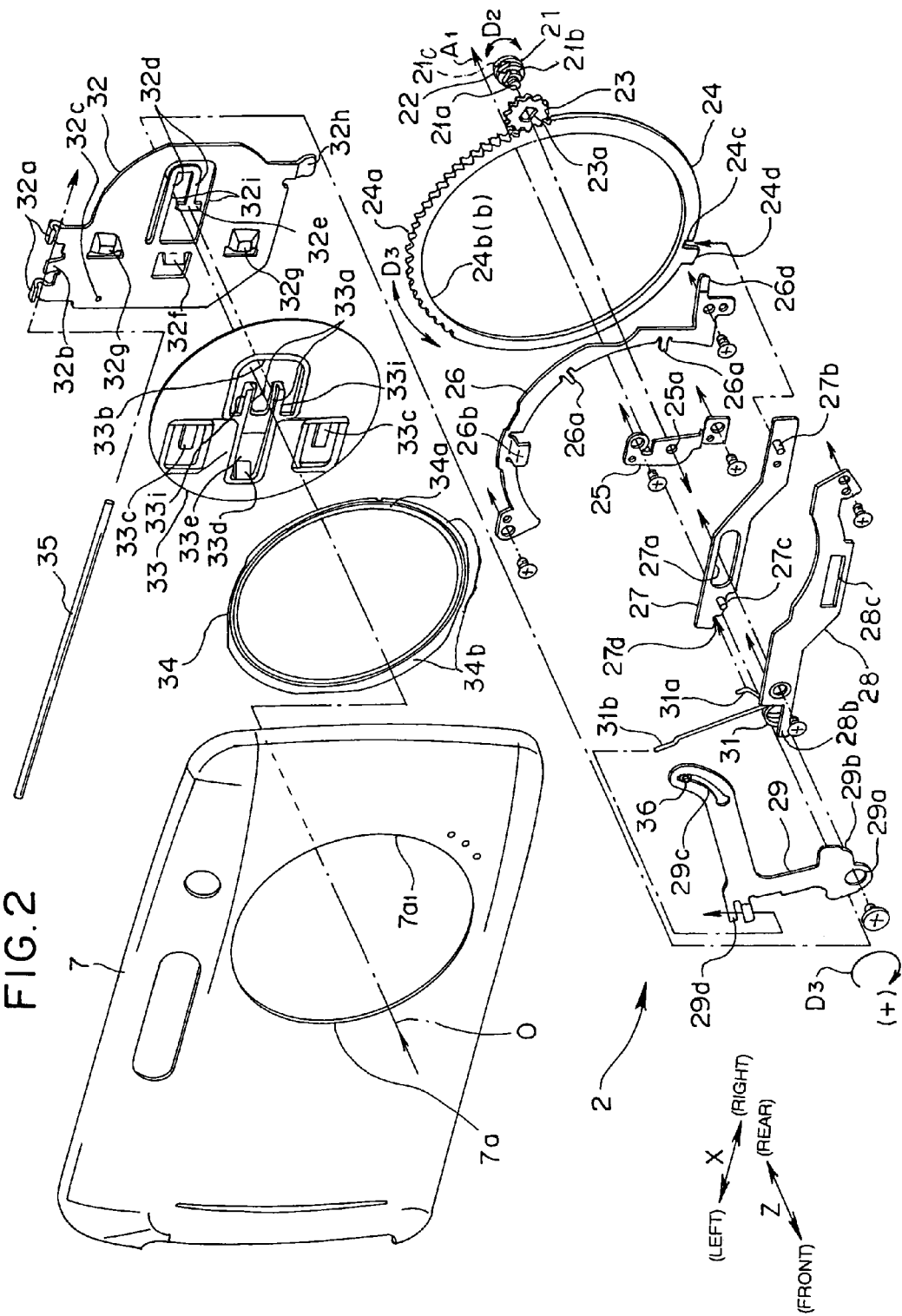
FIG. 2 is a disassembled perspective view of a barrier unit including a front cover, a lens barrier, and a barrier driving unit of the camera shown in FIG. 1.
Figure 3:
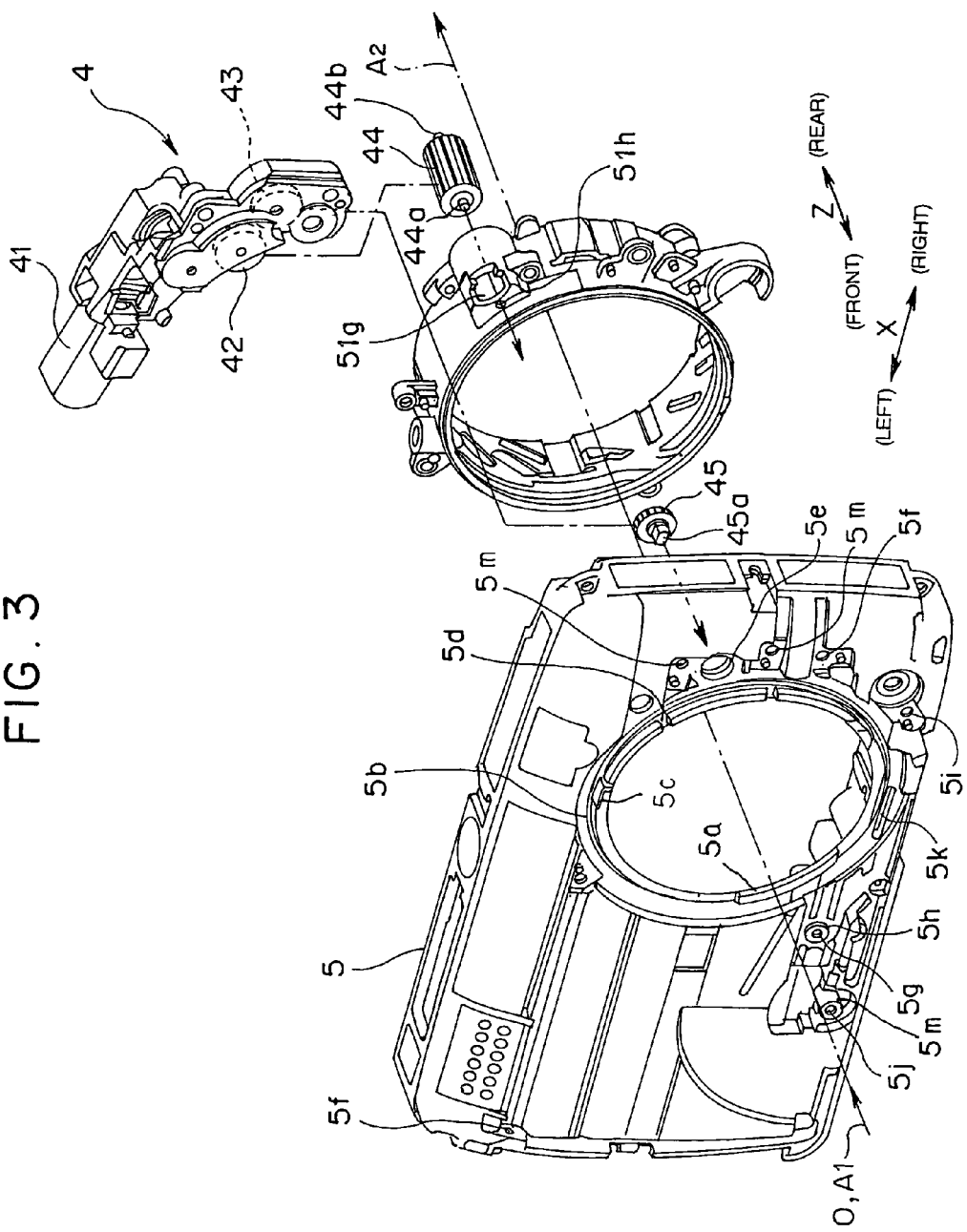
FIG. 3 is a disassembled perspective view of a front main body, a fixed frame, and a driving unit of the camera shown in FIG. 1.
Figure 4:
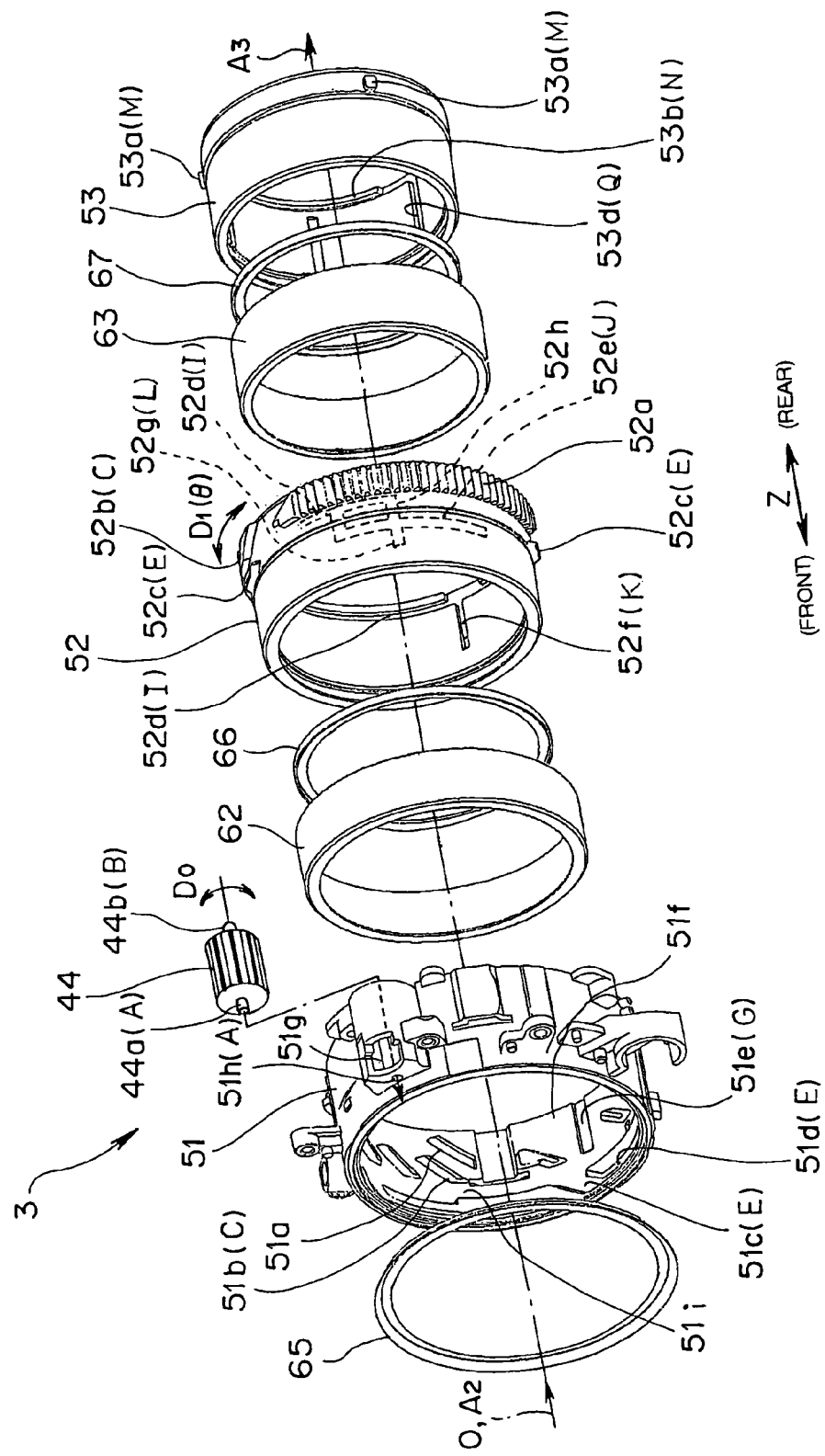
FIG. 4 is a disassembled perspective view which shows a part of a lens barrel of the camera shown in FIG. 1.
Figure 5:
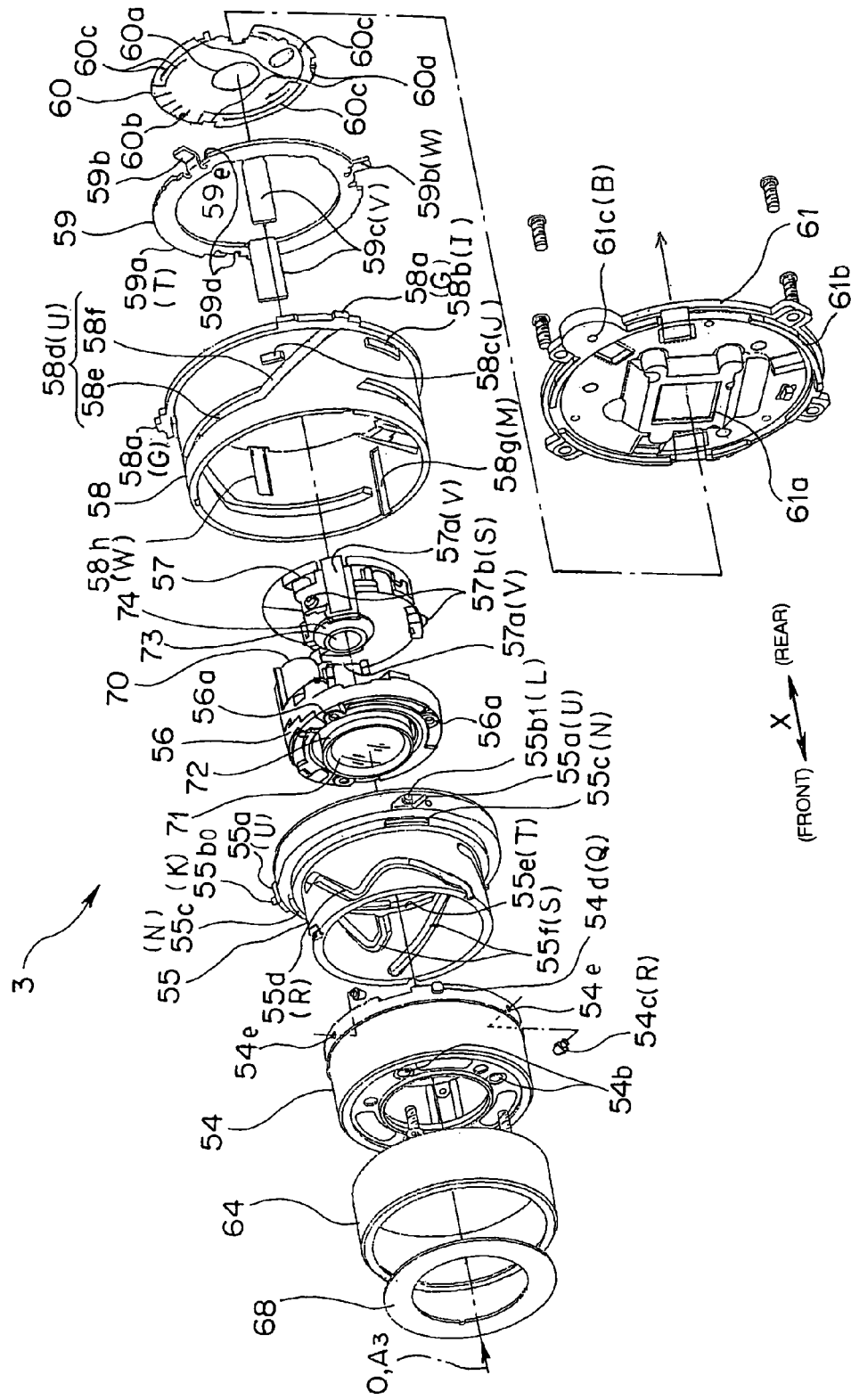
FIG. 5 is a disassembled perspective view which shows another part of the lens barrel of the camera shown in FIG. 1.
Figure 6:
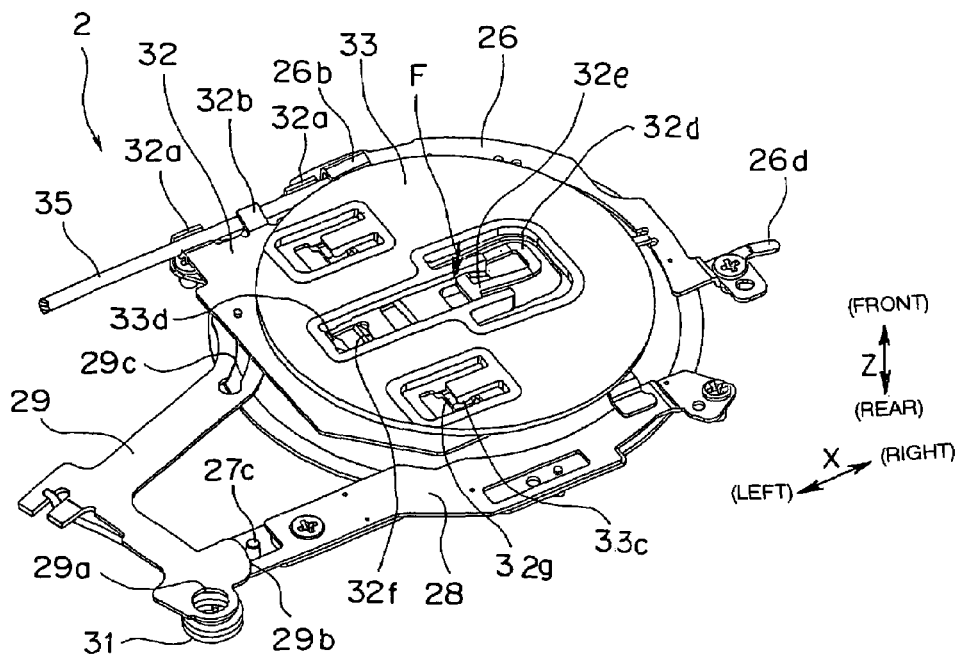
FIG. 6 a perspective view of a barrier unit shown in FIG. 1, without barrier cap as viewed from the front side.
Figure 7:
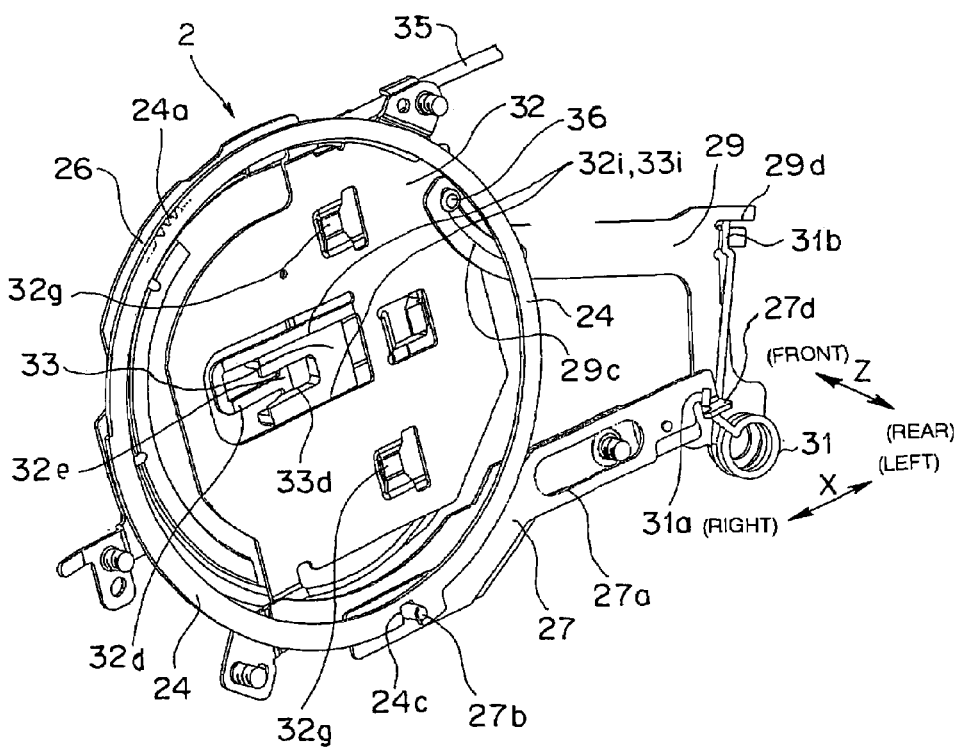
FIG. 7 is a perspective view of the barrier unit shown in FIG. 6, as viewed from the rear side.
Figure 8:
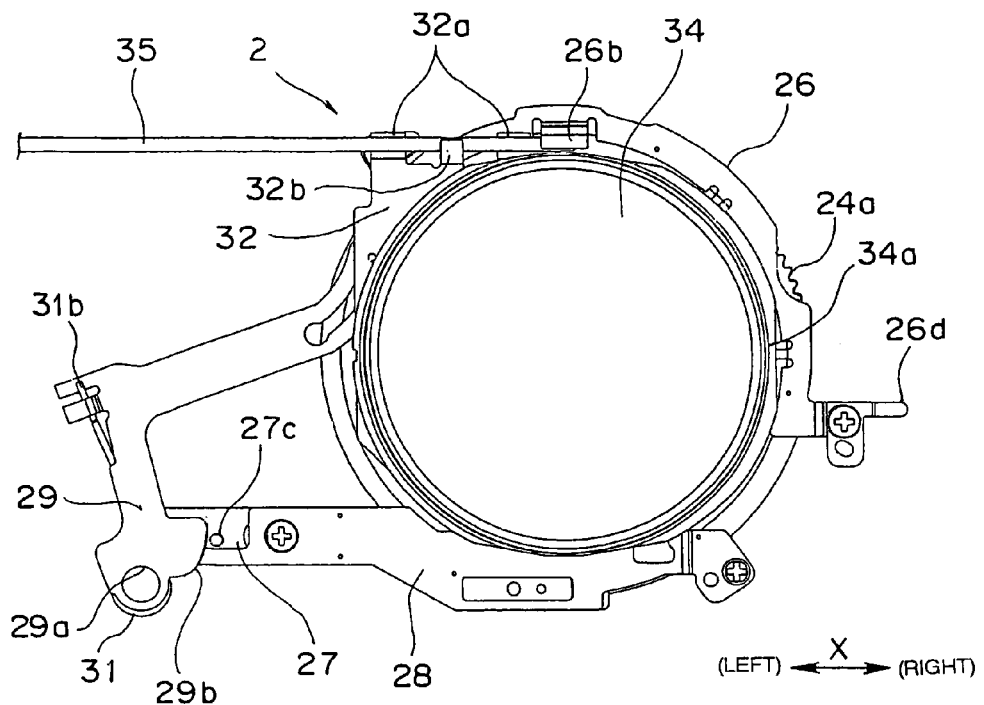
FIG. 8 is a front view of the barrier unit shown in FIG. 6.
Figure 9:
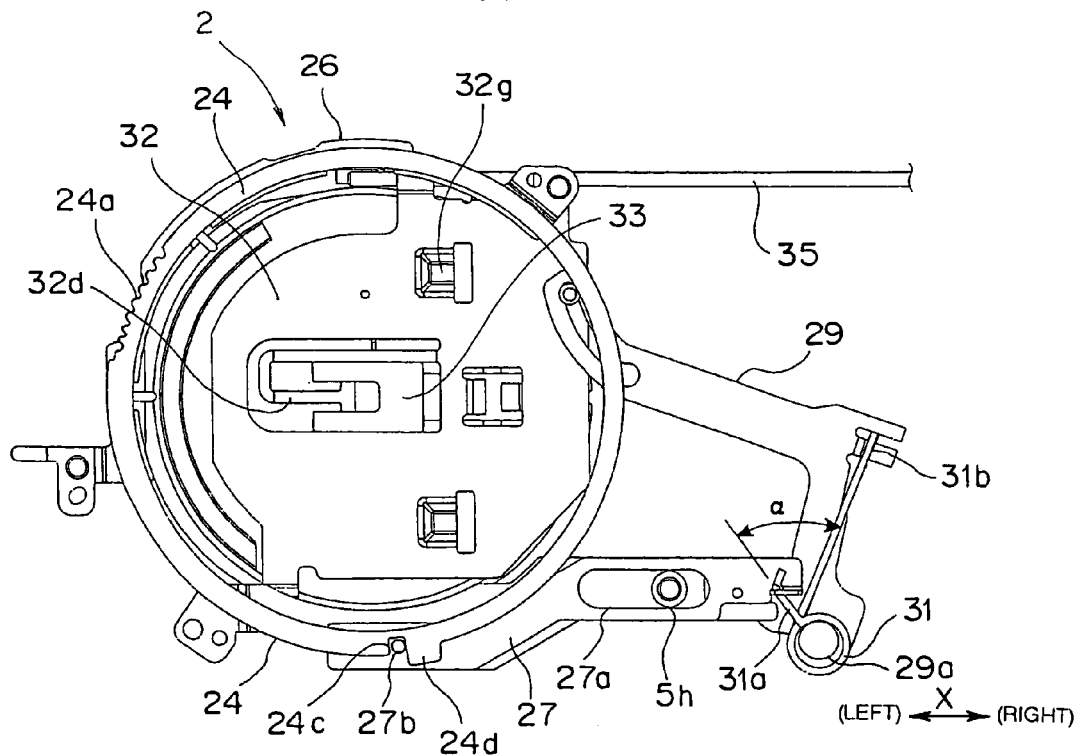
FIG. 9 is a rear view of the barrier unit shown in FIG. 6.
Figure 10:
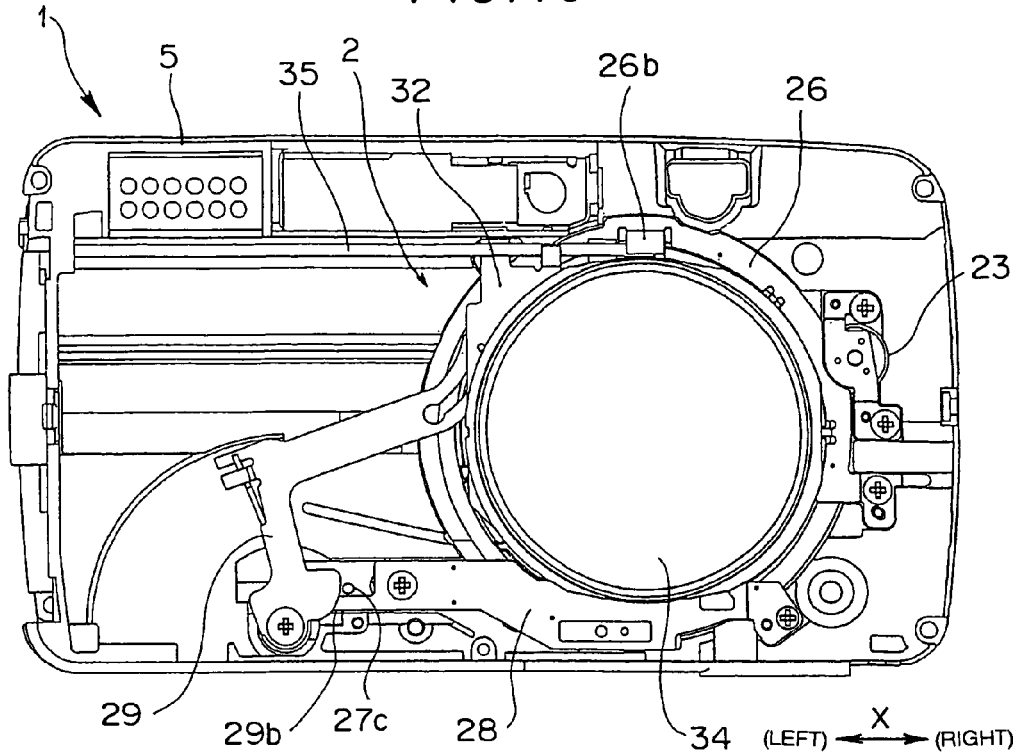
FIG. 10 is a front view of the camera shown in FIG. 1, in the lens-barrier closed state without a front metal cover.
Figure 11:
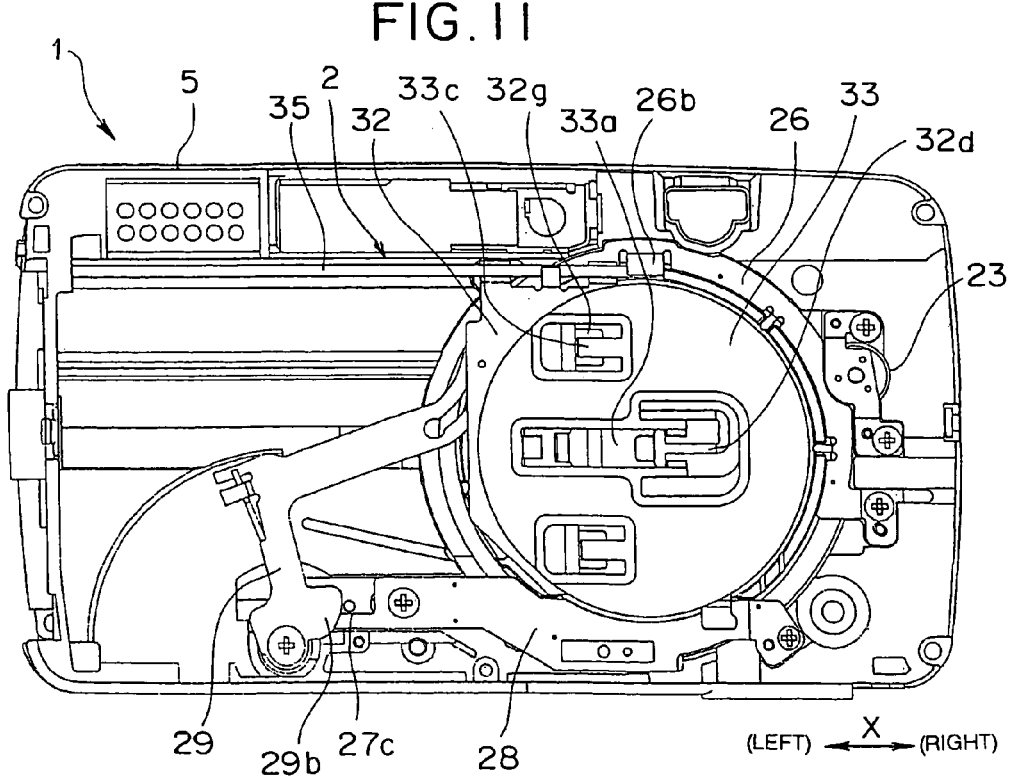
FIG. 11 is a front view of the camera shown in FIG. 10, without the barrier cap.
Figure 12:
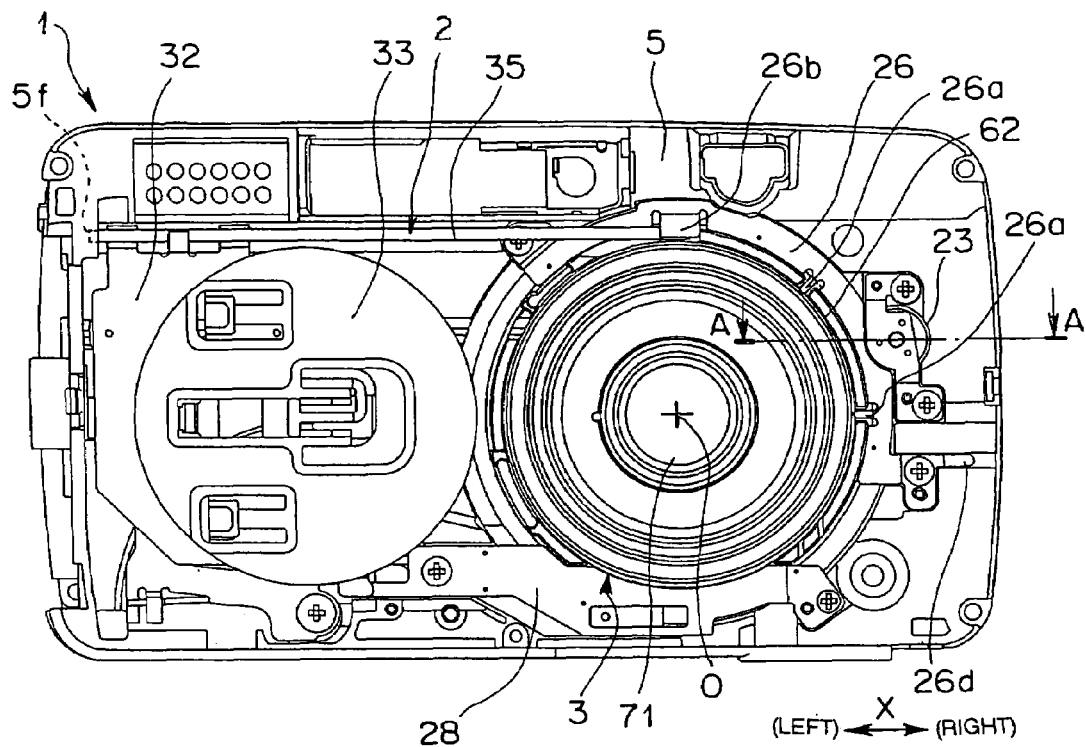
FIG. 12 is a front view of the camera shown in FIG. 1, in the lens-barrier opened state without the front cover.
Figure 13:
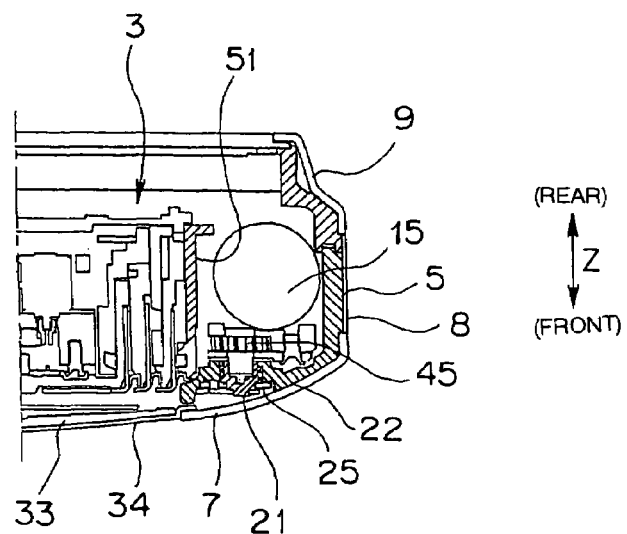
FIG. 13 is a sectional view taken along line A-A in FIG. 12.
Figure 14:
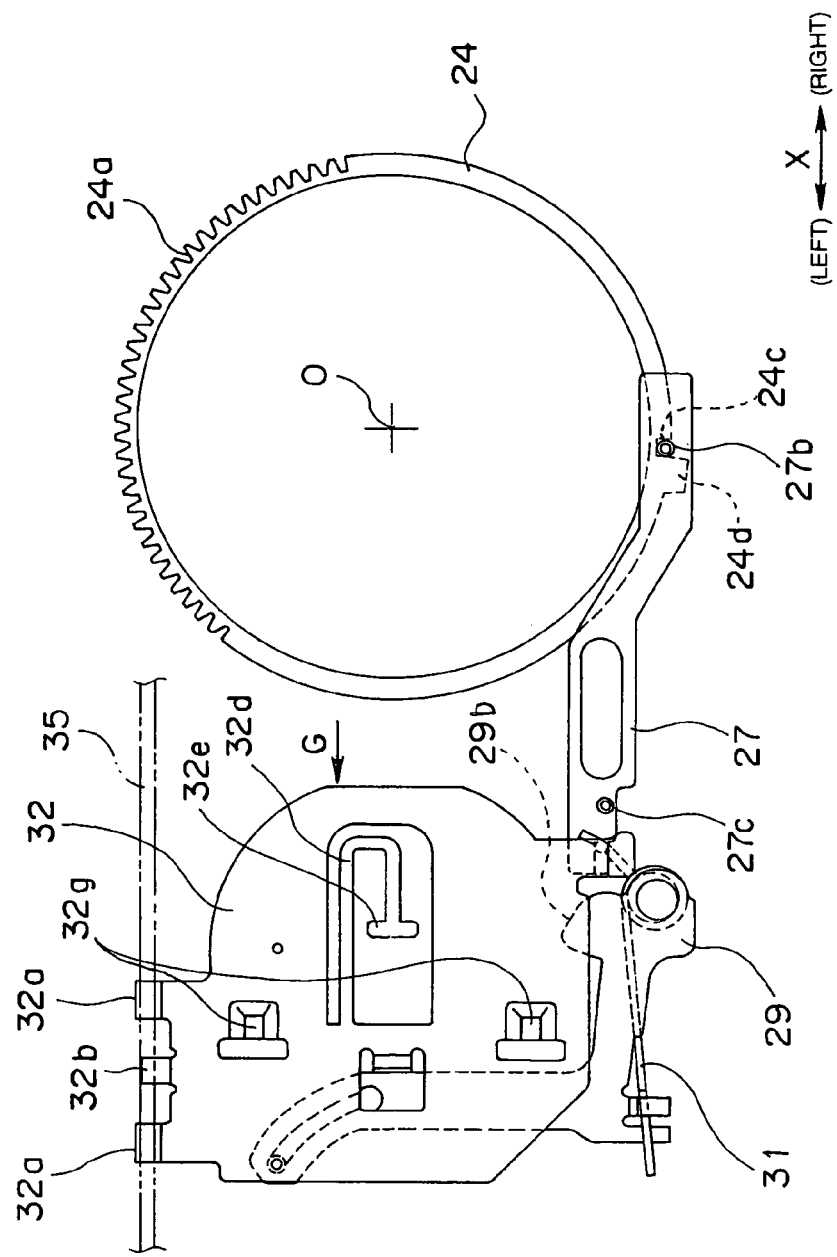
FIG. 14 is a front view which shows the barrier unit shown in FIG. 6, in which movement of the lens barrier toward the closed position is hindered by undesired external force in the lens-barrier closing action.

FIG. 1 is a horizontal sectional view which shows a camera including a barrier in the lens-barrier closed state and the lens barrel in the lens-barrel collapsed state, through a plane including the optical axis thereof, according to an embodiment of the present invention. FIGS. 2 through 5 are disassembled perspective views of the aforementioned camera. FIG. 2 is a barrier unit including a front cover, a lens barrier, and a barrier driving unit. FIG. 3 is a disassembled perspective view which shows a front main body, a fixed frame, and a driving unit. FIG. 4 is a disassembled perspective view which shows a part of a lens barrel. FIG. 5 is a disassembled perspective view which shows another part of the lens barrel. FIG. 6 is a perspective view which shows the aforementioned barrier unit without a barrier cap as viewed from the front side. FIG. 7 is a perspective view of the barrier unit as viewed from the rear side. FIG. 8 is a front view of the barrier unit. FIG. 9 is a rear view of the barrier unit. FIG. 10 is a front view of the aforementioned camera in the lens-barrier closed state without a front metal cover. FIG. 11 is a front view of the camera in the state shown in FIG. 10 without the barrier cap. FIG. 12 is a front view of the camera in the lens-barrier opened state without the front metal cover. FIG. 13 is a sectional view taken along line A-A in FIG. 12. FIG. 14 is a front view which shows an action of the aforementioned barrier in which movement of the lens barrier in the closed direction is blocked by unintended external force.

Note that the optical axis of a photographing lens of the camera according to the present embodiment will be referred to as "optical axis O", and the direction parallel to the optical axis O will be referred to as "Z direction" in the following description. Also, the subject side in the Z direction will be referred to as "front side". On the other hand, the focusing side in the Z direction will be referred to as "rear side (back side)". The horizontal direction orthogonal to the Z direction will be referred to as "X direction". The left side and the right side are defined as viewed from the subject side (front side). With regard to the rotation direction, clockwise rotation and the counterclockwise rotation are defined as viewed from the subject side.

A camera 1 according to the present invention is a waterproof camera having a barrier, which includes a CCD as an image capturing device and a lens barrel having a mechanism which allows the lens-barrel collapsed state and the zoom state. As shown in FIG. 1, the camera 1 includes a front main body 5 having a lens opening 5a and a rear main body 6 as a frame member (camera main body) storing camera built-in components such as a driving unit 4 and so forth.

A front metal cover 7, formed of aluminum alloy or the like and serving as an exterior member having a lens opening 7a which is an opening for a photographing lens, is fixed to the front face of the front main body 5 by adhesion or with screws. Furthermore, a rear metal cover 9, formed of aluminum alloy or the like and serving as an exterior member having an LCD display window, is fixed to the rear portion of the rear main body 6 by adhesion or with screws.

Furthermore, a band-shaped intermediate metal cover 8 formed of aluminum alloy or the like and serving as an exterior member is provided to a part of the perimeter between the front metal cover 7 and the rear metal cover 9. Furthermore, a lid 11 for an external terminal and a memory card is provided to the left end of the front main body 5, with a configuration which allows opening/closing thereof.

Note that with the lens opening 7a of the front metal cover 7, the perimeter thereof on the right side in the X direction slightly inclines backward in the Z direction.

The main body formed of the front main body 5 and the rear main body 6 includes a lens barrel 3 at a position on the right side in the X direction having functions of zooming and focusing, and a zoom driving unit 4 for driving the lens barrel 3 and a barrier unit 2 including a lens barrier. Note that the lens barrel 3 includes a lens driving unit which allows forward/backward movement thereof along the lens movement path between: the lens-barrel collapsed position where the lens barrel is stored and photographing cannot be performed; and the photographing enabling position where the lens barrel is extended from the lens-barrel collapsed position and photographing can be performed.

Furthermore, the aforementioned main body includes electric circuit boards 12 and 13, a recording medium slot 14 provided to the electric circuit board 13, and a main power supply battery 17 stored in a battery storage chamber, and so forth therewithin on the left side in the X direction in that order from the front side. A strobe main capacitor 15 is stored in a space between the right side of the lens barrel 3 and the front main body 5. Furthermore, an LCD 16 is provided to the inner side of the LCD display window of the rear main body 6. The barrier unit 2, which includes a lens barrier 33 and the barrier driving unit for driving the lens barrier 33, is provided within a space between the front main body 5 and the front metal cover 7.

Note that the connection between the front main body 5 and the rear main body 6, which includes the perimeter of the lens barrel 3, has a waterproof mechanism. Specifically, a protruding fitting portion and a recessed fitting portion are formed on the aforementioned connection portions of the front main body 5 and the rear main body 6, respectively. With such a structure, string-shaped packing 18 is wound onto the fitting portions one or more times and the fitting portions are fit to each other with the string-shaped packing introduced therebetween, thereby sealing the connection portion.

Note that the front main body 5 and the front metal cover 7 do not have a complete waterproof structure. However, the barrier unit 2 stored inside of the front metal cover 7 comprises no particular component which is affected by the intrusion of water.

The zoom driving unit 4 comprises a driving motor 41 serving as an electric driving source, a gear train which is stored in a gearbox fixed to and held by the front main body 5 with screws and which is driven by the driving motor 41, a first output gear 42 driven by the gear train, and a second output gear 43 driven, synchronously with the action of the first output gear 42, as shown in FIG. 3.

The first output gear 42 meshes with a lens barrel driving gear 44, which has a large length and which is provided in a gear chamber 51g formed on a fixed frame 51 of the lens barrel 3. The lens barrel driving gear 44 is meshed with an outer-circumferential-surface gear portion 52a (FIG. 4) formed on a rotating moving frame 52 of the lens barrel 3 as described later. With such a configuration, upon driving and rotating the rotating moving frame 52, each component (FIGS. 4 and 5) of the lens barrel frame of the lens barrel is moved forward/backward and/or rotated.

Furthermore, a barrier driving gear 45 which meshes with the second output gear 43 is rotatably held by the aforementioned gear box and is stored therein. The barrier unit 2 is driven by the barrier driving gear 45. Note that the barrier driving gear 45 has an output shaft end 45a having a non-circular cross-section, thereby enabling determination of the fitting angle. The barrier driving gear 45 is connected to a pinion 23 for driving the barrier unit through a rotary shaft member 21 described later.

The driving motor 41 drives the lens barrel 3 to turn and/or move-forward/backward between the storage state and the photographing state thereof through the lens barrel driving gear 44 and the rotating moving frame 52 (FIG. 4). Furthermore, the driving motor 41 drives the barrier unit 2 to perform opening/closing actions thereof through the barrier driving gear 45, the pinion 23, and a driving ring 24 (FIG. 2). Note that the rotating moving frame 52 and the driving ring 24 are moved, synchronously with the action of each other.

Detailed description will be made later regarding the driving of the lens barrel 3 with reference to the development view shown in FIG. 22 which shows the fixed frame and the rotating moving frame in the state of action, and the development view shown in FIG. 23 which shows the rotating moving frame, a linear-action frame, and the cam frame in the state of action. Here, brief description will be made below regarding the driving of the lens barrel 3. Let us say that with the camera 1, the rotating moving frame 52 is positioned at the initial turn position P0 (lens-barrier closed state/lens-barrel collapsed state) in which the barrier is closed and the lens barrel 3 is collapsed. In this state, upon starting the driving motor 41, the rotating moving frame 52 is turned by a turn angle $\theta 0$ for allowing extension (for opening the barrier), whereby the rotating moving frame 52 is moved to the P1 where the barrier is opened and the lens barrel 3 remains collapsed, and which is the standby position for extension (development view shown in FIG. 22B).

Subsequently, upon turning the rotating moving frame 52 by a turn angle $\theta 1$, which corresponds to the range from the start to the end of extension of the lens barrel 3, the rotating moving frame 52 is moved to the position P2 where the barrier is opened and the lens barrel 3 is extended, and which is the position where extension of the lens barrel has been completed (i.e., wide-angle state). Furthermore, upon turning the rotating moving frame 52 by $\theta 2$ (zoom turn angle), the rotating moving frame 52 is moved to the position P3 where the barrier is opened and the lens barrel 3 is in the zoom state (telescopic state).

The rotating moving frame 52 is driven by the driving motor 41 by a turn angle which is the sum of the turn angles for the extension standby, extension, and the zoom action of the lens barrel 3 described above, i.e., $\theta 0 + \theta 1 + \theta 2$. At the same time, the driving ring 24 is driven to turn by an angle corresponding to the turn angle $\theta 0 + \theta 1 + \theta 2$ through the barrier driving gear 45 and the pinion 23, synchronously with the turning of the rotating moving frame 52.

As described above, the barrier unit 2 comprises the lens barrel 33 which is a barrier member to be driven, shown in FIG. 2, and a barrier driving unit serving as driven portion driving means (barrier driving means).

The lens barrier 33 is formed of resin in the shape of a disk. A barrier cap 34 is fixed to the front face of the lens barrier 33 by adhesion. The lens barrier 33 is moved so as to slide in the X direction by the driving force of the driving motor 41 through the second output gear 43 and the aforementioned barrier driving unit.

The lens barrier 33 is moved so as to slide between two positions. One is the closed position on the optical axis O facing the front face of the lens barrel frame (rotating moving frame 52 and so forth) including a first group lens 71 which is a photographing lens of the photographing lens barrel 3, i.e., the protection position (first position) where the barrier 33 protects the photographing lenses at the lens-barrel collapsed position. The other is the opened position, i.e., the lens-barrier retracted position (second position) where the barrier 33 is retracted from the front of the first group lens 71, the rotating moving frame 52, and so forth.

Furthermore, at the time of the lens barrier 33 moving to the aforementioned protection position, the left side of the lens barrier 33 is turned so as to move forward in the Z direction as described later. As a result, the barrier cap 34 is fit to the lens opening 7a, and the front face thereof is moved so as to form a single surface along with the front face of the front metal cover 7 around the opening 7a.

The lens barrier 33 has: an opening 33b at the center thereof; two protrusions 33i protruding within the opening 33b in the X direction with the optical axis as the center; grooves which have notched portions provided on the front faces of the protrusions 33i so as to extend in the X direction; a slant face 33d provided at the left end of an opening 33e provided on the left side of the protrusions 33i; and two contact portions 33c protruding from the positions which are slightly distant from the optical axis O toward the left and which are distant from one another in the vertical direction.

The barrier cap 34 is formed of a metal disk such as an aluminum-alloy disk. Furthermore, the barrier cap 34 has a front face circular protrusion which allows fitting thereof into the lens opening 7a of the metal cover 7, and a flange 34b along the perimeter of the protrusion.

The aforementioned barrier driving unit comprises a rotary shaft member (rotary member) 21 serving as an outside transmission member, a pinion 23 which is formed of a metal plate and which is connected to the rotary shaft member 21, a pinion presser 25, a driving mechanism described later, a moving plate 32 serving as a moving member movably held by a barrier lever 29, and a guide shaft 35 for guiding the moving plate 32 sliding in the X direction, as shown in FIG. 2.

Note that the aforementioned driving mechanism comprises: a driving ring 24 which is turnably held by the front main body 5 and which meshes with the pinion 23; a driving ring presser 26; a slider 27 serving as a first member which allows engagement thereof with the driving ring 24; a slider presser 28; the barrier lever 29 serving as a second member (lever member) which is turned, synchronously with the action of the slider 27; and a torsion spring 31 which is force-applying means for applying force such that the barrier lever 29 and the slider 27 approach each other.

The rotary shaft member 21 is a small cylindrical shaft member provided along an axis in the X direction. The rotary shaft member 21 has a fitting shaft opening 21c which is a blind hole for fitting the output shaft end 45a of the barrier driving gear 45 provided on the rear side while inhibiting relative rotation between the rotary shaft member 21 and the barrier driving gear 45. An O-ring 22 which is a sealing member is mounted to a groove formed on the outer-circumferential-surface portion of the rotary shaft member 21. Furthermore, the rotary shaft member 21 includes: a fitting protrusion 21b for being fit to the shaft opening of the pinion 23 while inhibiting rotation therebetween; and a tip shaft 21a, at the tip thereof.

The rotary shaft member 21 is rotatably fit to and passes through a stepped through hole 5e which is a through hole provided on the right side of the front main body 5 with the O-ring 22 introduced between the rotary shaft member 21 and the stepped through hole 5e as shown in the partial sectional view in FIG. 13. The output shaft end 45a of the barrier driving gear 45 is fit to the rear-side portion of the rotary shaft member 21 while inhibiting relative rotation therebetween. Furthermore, the pinion 23 is fit to the front-side portion of the rotary shaft member 21 while inhibiting relative rotation therebetween.

Then, the pinion presser 25 is mounted to the front main body 5 with a screw to a screw opening 5m formed on the front main body 5, with the tip shaft 21a of the rotary shaft member 21 rotatably fit into a shaft opening 25a formed on the pinion presser 25, and with the forward movement of the pinion 23 inhibited by the pinion presser 25.

Thus, the rotation is transmitted from the barrier driving gear 45 to the pinion 23 provided outside of the front main body 5 through the rotary shaft member 21 which rotatably passes through the front main body 5, with the rotary shaft member 21 sealed by the O-ring 22.

Note that the thorough hole 5e of the front main body 5, which communicates with the outside and inside of the main front body 5, is sealed as described above. Furthermore, the other connection portions including the main body connection portion described above are sealed. Thus, the entire outer surface of the main body is sealed. At least, the inner space surrounded by the front main body 5 and the rear main body 6 is kept waterproof. The space between the front face of the front main body 5 and the front metal cover 7, where the components of the barrier unit 2 are provided, is not waterproof. However, the barrier unit 2 includes no particular component which needs to be waterproof, and accordingly, such a configuration present no difficulty.

The driving ring 24 is a member which is turnably inserted to a driving ring fitting outer-circumferential-surface portion 5b provided to the perimeter of the lens opening 5a of the front main body 5 with the optical axis O as the center. The driving ring 24 includes a gear portion 24a provided to the outer circumferential surface thereof in a predetermined angle range, and a notch 24c and a protrusion 24d which are provided so as to be engaged with the outer-circumferential-surface portion to face the gear portion 24a and which serve as an engaging/releasing mechanism.

The gear portion 24a meshes with the pinion 23. The gear portion 24a is provided so as to permit rotation of the pinion 23 driven by the driving motor 41 in the aforementioned angle range corresponding to the sum of the turn angles θ0, θ1, and θ2 of the rotating moving frame 5 of the lens barrel described above.

With regard to the notch 24c, upon turning the driving ring 24 from the initial position in the clockwise direction, a following pin 27b of the slider 27 is engaged with the notch 24c in a predetermined turning range (corresponding to the turn angle θ0 of the rotating moving frame 52). Upon further turning the driving ring 24 by an angle exceeding the aforementioned turning range, the engagement of the following pin 27b with the notch 24c is released.

On the other hand, upon turning the driving ring 24 in the counterclockwise direction, the released following pin 27b is engaged with the notch 24c. Subsequently, the driving ring 24 is turned in the counterclockwise direction with the following pin 27b engaged with the notch 24c. Furthermore, in the state in which the following pin 27b is engaged with the notch 24c, the slider 27 is moved so as to slide toward the left or the right in the X direction. On the other hand, in the state in which the following pin 27b is released, the slider 27 is stationary at a position in the left horizontal moving direction.

The driving ring presser 26 is mounted to the perimeter of the lens opening 5a and is fixed with screws with protrusions 26a thereof inserted to grooves 5d formed on the front main body 5. The movement of the driving ring 24 is restricted in the Z direction by the driving ring fitting outer-circumferential-surface portion 5b through the driving ring presser 26. Furthermore, the driving ring 24 is turnably held by the driving ring presser 26. Furthermore, the driving ring presser 26 includes a shaft-holding protrusion 26b for holding a guide shaft 35, and a grounded portion 26d.

The grounded portion 26d of the driving ring presser 26 is in contact with the inner circumferential surface of the metal cover 7 after-assembly of the camera. On the other hand, the front metal cover 7, the intermediate metal cover 8, and the rear metal cover 9 are electrically connected to each other. Furthermore, the intermediate metal cover 8 and the ground line of a built-in electric circuit board are connected by screws.

Thus, all of the metallic outer components of the camera 1 are electrically connected to the ground line of the electric circuit. On the other hand, the tips of the protrusions 26a of the driving ring presser 26 are provided so as to approach the very edge of a metallic cap 62 provided on the outer circumferential surface of the rotating moving frame 52 of the lens barrel 3 in the state in which the metallic cap 62 is extended. This enables discharge of static electricity generated on the cap of the lens barrel 3 through the tips of the protrusions 26a at the time of extension of the lens barrel.

The slider 27 is held by and mounted to the lower portion of the front face of the front main body 5 with the follower pin 27b fit to and engaged with the notch 24c of the driving ring 24, with the tip of the follower pin 27b slidably inserted to a guide groove 5k formed on the front main body 5 and extending in the X direction, and further, with a guide groove 27a extending in the X direction slidably fit to a boss 5h provided to the front main body 5. The slider 27 includes a driving pin 27c and a spring hook portion 27d on the left side thereof in the X direction.

The slider presser 28 is fixed with a screw to a screw hole 5g formed in the boss 5h of the front main body 5 and with a screw to a screw hole 5i formed on the right side. The slider presser 28 thus fixed restricts movement of the slider 27 in the Z direction while allowing sliding of the slider 27 in the X direction. The slider presser 28 includes a protrusion 28b protruding in the left end direction, and a slot 28c extending in the X direction on the center thereof.

Upon the driving pin 27c of the slider 27 coming in contact with a cam portion 29b of the barrier lever 29 described later, the protrusion 28b comes in contact with the driving pin 27c, and receives the force in the lower direction from the driving pin 27c. The slot 28c is formed for facilitating mounting of the slider 27 in assembly.

The barrier lever 29 is mounted with a shaft opening 29a drivably fit to a boss 5m provided to the front main body 5, and with a screw to a screw opening 5j formed in the boss 5m. The barrier lever 29 includes a cam portion 29b near the shaft opening 29a, a spring hook portion 29d, and a guide groove 29c formed in a curve on the end thereof.

The cam portion 29b of the barrier lever 29 is in contact with the driving pin 27c of the slider 27. The barrier lever 29 is driven and turned in the X direction following the movement of the slider 27. A coupling pin (with a head) 36 fixed to the rear face of the moving plate 32 is slidably fit to the guide groove 29c.

Furthermore, one end 31b of the torsion spring 31 inserted to the boss 5m is hooked on the spring hook portion 29b of the barrier lever 29. Thus, force is applied to the barrier lever 29 so as to turn in the clockwise direction. The other end 31a of the torsion spring 31 is hooked on the spring hook portion 27d of the slider 27. The torsion spring 31 is mounted in a charged state. In such a charged state, force is applied to the slider 27 toward the left in the X direction so that the slider 27 approaches the barrier lever 29. Furthermore, in such a charged state, force is applied to the barrier lever 29 so that it turns clockwise (in the direction where the driving pin 27c of the slider 27 comes in contact with the cam portion 29b of the barrier lever 29).

The guide shaft 35 is a straight shaft extending in the X direction. One end of the guide shaft 35 is held by a shaft holding portion 5f provided on the left side of the front main body 5. The other end thereof is held by a shaft holding portion 5c provided at the upper portion of the perimeter the lens opening 5a.

The moving plate 32 is a member formed of a metallic plate such as a stainless steel plate or the like having a flat surface corresponding to the lens barrier 33. The moving plate 32 is held by the guide shaft 35 passing through two shaft-slidably-support portions 32a which permit sliding motion thereof and one center shaft-holding protrusion 32b, which allows the moving plate 32 to slide in the X direction while keeping the plane face thereof orthogonal to the Z direction.

The moving plate 32 includes: a fitting groove 32i which is a fitting portion formed at the center thereof with the optical axis O as the center; and a cantilever-shaped spring portion 32d which extends from the upper side of the fitting groove in a "U" shape with the long sides thereof parallel to the X direction, serving as force-applying means. The spring portion 32d includes a T-shaped tip portion 32e at the tip thereof, which protrudes in the vertical direction.

Furthermore, the moving plate 32 includes: a tab portion 32f which inclines to the left, on the left side of the fitting groove 32i; and two protrusions 32g on the upper side and the lower side thereof on the left side with the optical axis O as the center, each of which protrudes toward the front side. Each protrusion 32g has a slant right-side face. Furthermore, the moving plate 32 includes a contact sliding portion 32h protruding from the lower end thereof.

The lens barrier 33 is mounted to the moving plate 32 with the fitting groove 32i fit to the protrusions 33i, which allows relative sliding thereof in the X direction while inhibiting relative rotation thereof. In the mounted state, the T-shaped tip portion 32e of the moving plate 32 is in contact with the groove 33a of the lens barrier 33, and the lens barrier 33 is always pressed toward the rear side (F direction in FIG. 6) by force applied from the spring portion 32d. Furthermore, in a case that the lens barrier 33 is positioned at the closed position, the tab portion 32f is inserted to the opening 33e of the lens barrier 33, and the top portions of the protrusions 32g are in contact with the corresponding contact portions 33c of the lens barrier 33.

On the other hand, in a case that the lens barrier 33 is positioned at the opened position, the moving plate 32 is moved relatively with respect to the lens barrier 33 so as to slide by a predetermined movement amount toward the left in the X direction from the relative position where the lens barrier 33 and the moving plate 32 are positioned in the aforementioned closed position. Thus, the tab portion 32f is in contact with the slant face 33d of the lens barrier 33. Furthermore, the contact portions 33c of the lens barrier 33 slide downward from the protrusions 32g and comes in contact with the lower and flat face on the right side thereof in the X direction, by force applied from the spring portion 32d, whereby the face of the lens barrier 33 is further in contact with the face of the moving plate 32.

The barrier lever 29 engaged with the coupling pin 36 having a head is inserted to the rear face of the moving plate 32. Accordingly, the moving plate 32 receives force toward the rear side in the Z direction from the barrier lever 29. This prevents deviation of the moving plate 32 toward the front side in the Z direction. On the other hand, the movement (deviation) of the moving plate 32 toward the rear side in the Z direction is suppressed by the guide shaft 35 supporting the upper portion of the moving plate 32 and the contact sliding portion 32h being slidably in contact with the face of the slider presser 28.

FIGS. 6 and 7 are perspective views which show the state of the barrier unit 2 having the aforementioned configuration being assembled and viewed from the front side and the rear side.

Next, description will be made regarding the opening/closing actions of the barrier unit 2 with reference to FIG. 1, FIGS. 8 through 12, FIG. 14, and FIGS. 15 through 18.

Figure 15:
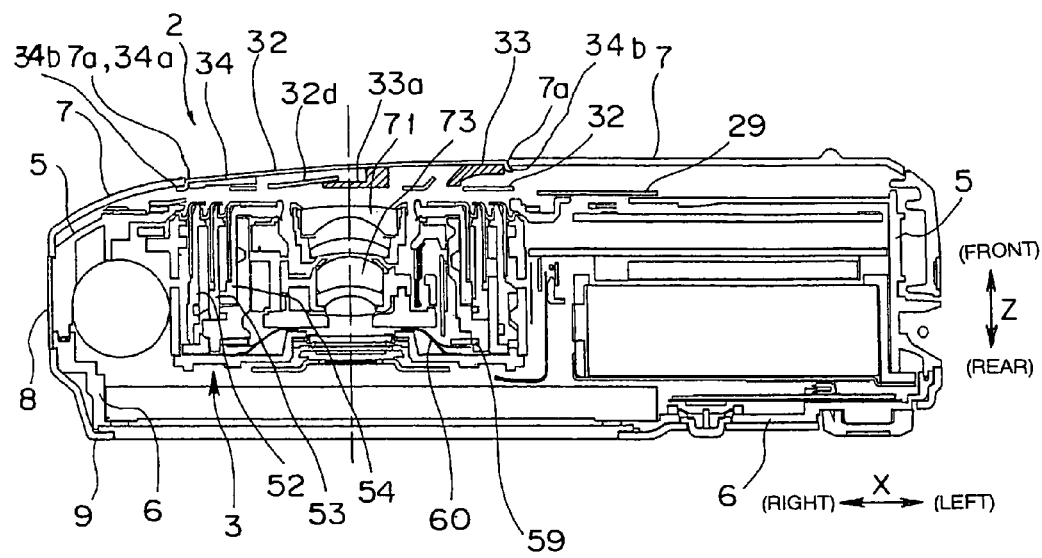
FIG. 15 is a horizontal sectional view which shows the camera shown in FIG. 1, in the state in which the barrier is closed, and the lens barrel is collapsed, through a plane including the optical axis.
Figure 16:
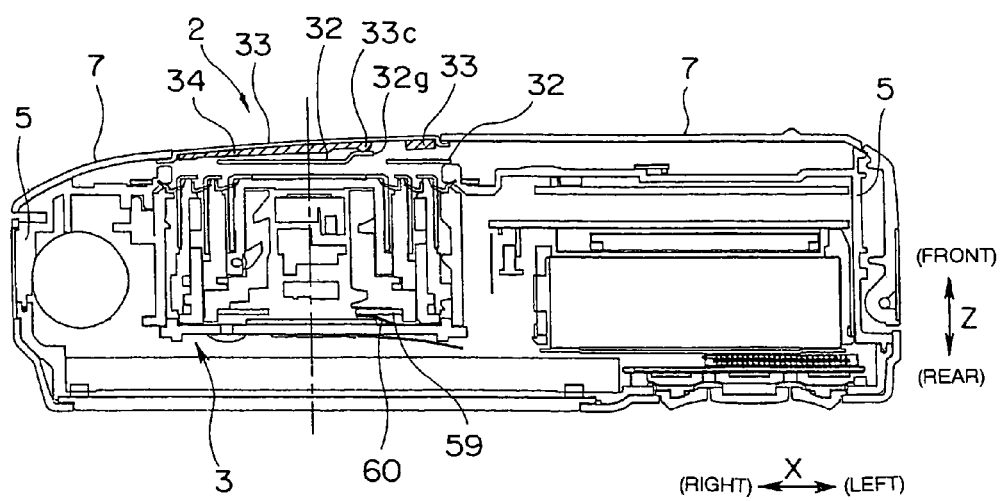
FIG. 16 is a horizontal sectional view which shows the camera shown in FIG. 1, in the state in which the barrier is closed, and the lens barrel is collapsed, and which crosses through a plane including a contact portion between a barrier body and a barrier base (plane not including the optical axis)
Figure 17:
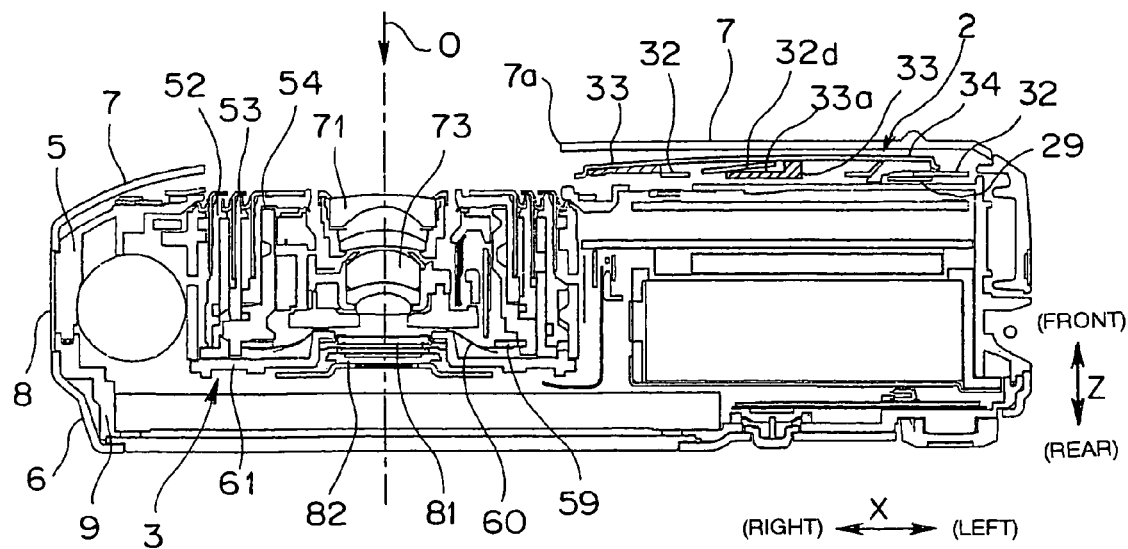
FIG. 17 is a horizontal sectional view of the camera shown in FIG. 1, in the state in which the barrier is opened and the lens barrel is collapsed, through a plane including the optical axis.
Figure 18:
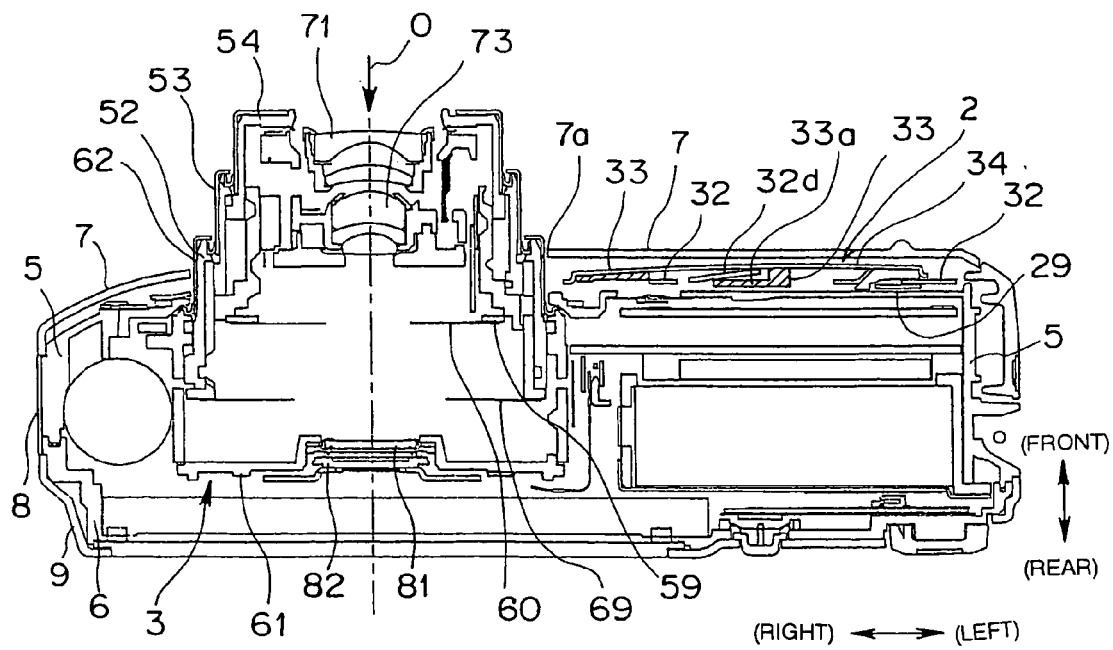
FIG. 18 is a horizontal sectional view of the camera shown in FIG. 1, in the state in which the barrier is opened, and the lens barrel is in the telescopic state, through a plane including the optical axis.

FIGS. 15, 17, and 18 are horizontal sectional views each of which shows the camera in the corresponding operation state described above. FIG. 15 shows a cross-section of the camera in the barrier closed and the lens-barrel collapsed state in the horizontal direction through a plane including the optical axis. FIG. 16 shows a cross-section of the camera in the horizontal direction in the state in which the barrier is closed and the lens barrel is collapsed, through a plane including a portion where the lens barrier and the moving plate are in contact with each other (i.e., through a plane lower than that including the optical axis). FIG. 17 shows a cross-section of the camera in the horizontal direction in the state in which the barrier is opened and the lens barrel is collapsed, through a plane including the optical axis. FIG. 18 shows a cross-section of the camera in the horizontal direction in the state in which the barrier is opened and the lens barrel is in the telescopic state, through a plane including the optical axis.

First, let us say that the camera 1 is in the initial state (completely collapsed state) in which the barrier is closed and the lens barrel is collapsed. In this state, upon starting the driving motor 41, the barrier unit 2 is opened by driving force of the driving motor 41 before extension of the lens barrel 3. Upon completion of the opening of the barrier unit 2, extension of the lens barrel 3 is started. Detailed description will be made later regarding the movement of the lens barrel 3 forward and backward.

Detailed description will be made below regarding the barrier opening/closing actions. FIGS. 1 through 3 show the state in which the lens barrel is completely collapsed and the driving ring 24 is positioned at the aforementioned initial position. On the other hand, FIGS. 8 through 11 show the state in which the barrier unit 2 is closed, and the lens barrier 33 shields the front face of the photographing lens (including the rotating moving frame 52 of the lens barrel and so forth).

In the lens-barrier closed state, the slider 27 is held at a predetermined position on the right end in the X direction with the following pin 27b engaging with the notch 24c of the driving ring 24. The barrier lever 29 receives force from the torsion spring 31 so as to turn clockwise with respect to the left end of the slider 27. Thus, the moving plate 32 receives force so as to move toward the right (in the X direction) through the coupling pin 36 with a head (FIGS. 10 and 11). The lens barrier 33 remains at the aforementioned closed position which is the right-end position thereof. In this state, the moving plate 32 is positioned on the left side relative to the lens barrier 33, and accordingly, the contact portions 33c run on the protrusions 32g of the moving plate 32 against the force of the spring portion 32d (FIG. 16).

In the lens-barrier closed state in which the lens barrier 33 is closed as described above, pressing force applied to the barrier cap 34 along the optical axis O is received by the protrusions 32g which are in contact with the rear faces of the contact portions 33c of the lens barrier 33. This prevents positional deviation of the barrier cap 34 and the lens barrier 33 in the direction of the inside of the camera (FIG. 16). On the other hand, the barrier cap 34 is fit to the opening 7a of the front metal cover 7, and the flange 34b of the barrier cap 34 is pressed into the inner-circumferential-surface side of the perimeter of the lens opening 7a of the front metal cover 7. Thus, the barrier cap 34 is held such that the front face of the barrier cap 34 and the front face of the perimeter of the lens opening 7a form a single surface.

Figure 22A:
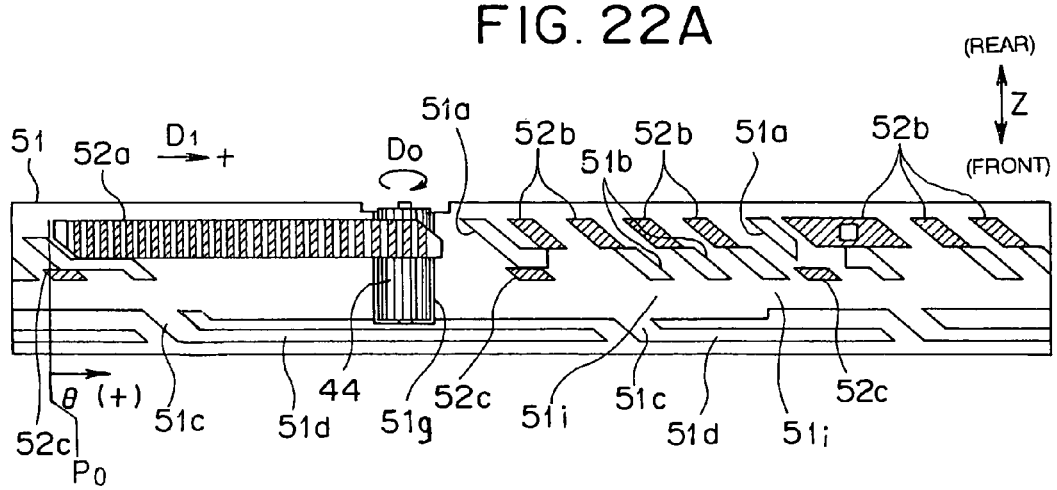
FIG. 22A is an operation-state development view in which a partial development view showing an outer-circumferential-surface gear portion, a helicoid thread (male thread), and protrusions of the rotating moving frame is superimposed on a development view showing the inner circumferential surface of the fixed frame and a lens barrel driving gear included in the lens barrel shown in FIGS. 4 and 5, and which shows the lens barrel of the camera shown in FIG. 1, in the initial driving state in which the lens barrier is closed, and the lens barrel is collapsed.
Figure 22B:
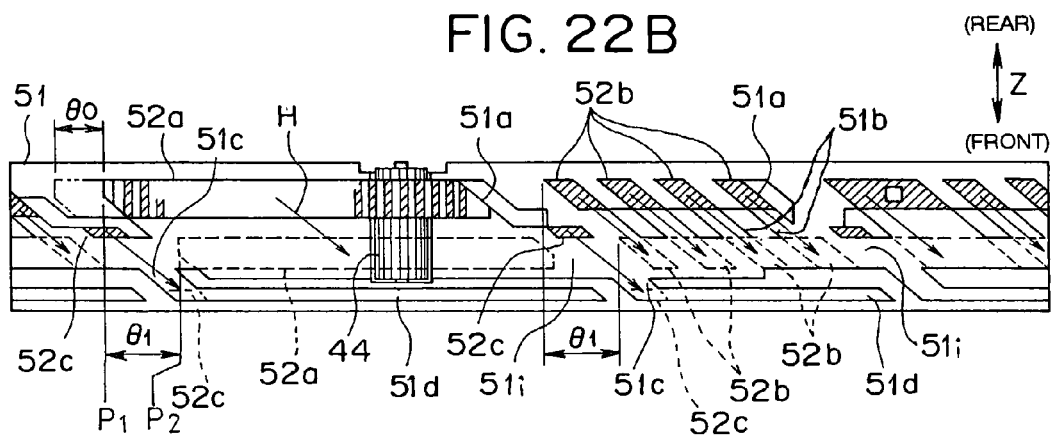
FIG. 22B is an operation-state development view in which a partial development view showing the outer-circumferential-surface gear portion, the helicoid thread (male thread), and the protrusions of the rotating moving frame is superimposed on a development view showing the inner circumferential surface of the fixed frame and the lens barrel driving gear included in the lens barrel shown in FIGS. 4 and 5, and which shows the lens barrel of the camera shown in FIG. 1, in the state in which the lens barrier is opened, the lens barrel is collapsed, and in the state in which the lens barrel is extended (wide-angle state)

In this state, upon the driving motor 41 rotating in the forward direction, the rotating moving frame 52 starts to turn from the initial turn position P0 (the state in which the barrier is closed and the lens barrel is collapsed) to the position P1 where the barrier is opened and the lens barrel remains collapsed (FIGS. 22A and 22B). The rotating moving frame 52 is only turned without extension thereof in such a range of the turn angle θ0. Note that in this case, the rotating moving frame 52 is only turned, without extending all the components such as the moving frame 53 (FIG. 4) of the lens barrel 3 and so forth which have an extension mechanism. Then, the rotating moving frame 52 reaches the position where extension thereof is started. The rotary shaft member 21 is driven and rotated, synchronously with the turning of the rotating moving frame 52. Thus, the driving ring 24 disposed outside of the front main body 5 is turned clockwise from the initial position which is the most counterclockwise position thereof.

Upon turning the driving ring 24 clockwise as described above, the slider 27 engaging with the driving ring 24 through the following pin 27b is moved so as to slide toward the left (X direction). Furthermore, upon turning the driving ring 24 by a turn angle corresponding to the turn angle θ0 of the rotating moving frame 52, the following pin 27b is disengaged and released from the notch 24c of the driving ring 24, whereby the slider 27 stops at the movement end position in the left direction.

Upon moving the slider 27 so as to slide in the left direction as described above, the barrier lever 29 is pressed and driven through the driving pin 27c of the slider 27 and the cam portion 29b of the barrier lever 29 which are pressed in contact with each other by the force of the charged torsion spring 31, whereby the barrier lever 29 is turned counterclockwise. The counterclockwise turn of the barrier lever 29 moves the moving plate 32 so as to slide toward the left along the guide shaft 35. In the early stage of the movement of the moving plate 32 toward the left, the barrier cap 34 remains fit to the lens opening 7a of the front metal cover 7 as shown in FIG. 1, and accordingly, the barrier cap 34 is not moved, and only the moving plate 32 is moved toward the left by a predetermined movement amount.

The contact portions 33c of the lens barrier 33 are pressed with the applying force of the spring portion 32d of the moving plate 32. Accordingly, each of the contact portions 33c slides downward toward the rear side in the Z direction along the right side face of the corresponding protrusion 32g of the moving plate 32, whereby the lens barrier 33 comes in contact with the front face of the moving plate 32. At the same time, the slant face 33d of the lens barrier 33 comes in contact with the tab portion 32f of the moving plate 32. The relative movement of the lens barrier 33 with respect to the moving plate 32 toward the rear side in the Z direction releases the barrier cap 34 from being fit into the lens opening 7a. Subsequently, the moving plate 32, the lens barrier 33, and the barrier cap 34 are moved so as to slide toward the opened position in the left direction as a single unit. In this state, the lens barrier 33 receives force of the spring portion 32d of the moving plate 32 toward the moving plate 32 in the rear direction, and the slant face 33d is in contact with the rear face of the tab portion 32f. This prevents the lens barrier 33 from deviating upward from the moving plate 32. Thus, the barrier cap 34 is moved toward the left without being in contact with the inner-circumferential-surface portion of the front metal cover 7 (FIG. 17).

When the slider 27 has reached the movement end position in the left direction described above, the lens barrier 33 and the barrier cap 34 are out of the region wherethrough the lens barrel 3 passes through for extension thereof, i.e., the lens-barrier retracted position where the lens barrier 33 and the barrier cap 34 are retracted from the lens opening 7a of the front metal cover 7 or the front of the photographing lens (FIG. 12).

Upon further turning the rotating moving frame 52 by the turn angle θ1 in counterclockwise direction by rotation of the driving motor 41 after the turning of the rotating moving frame 52 by the turn angle θ0, the rotating moving frame 52 of the lens barrel 3 and other lens-barrel frame components having a mechanism to move forward and backward are extended to an extended position where photographing can be performed. Furthermore, upon turning the rotating moving frame 52 in a range of the turn angle θ2, the lens-barrel frame components having a mechanism to move forward and backward are moved forward from the wide-angle position to the telescopic position. Furthermore, the driving ring 24 is turned clockwise corresponding to the range of the turn angle θ1 and θ2 of the rotating moving frame 52 described above. However, in such a turning range of the driving ring 24, the following pin 27b of the slider 27 is disengaged from the notch 24c of the driving ring 24, and is in contact with the outer-circumferential-surface portion of the driving ring 24. As described above, the following pin 27b is in contact with the outer-circumferential-surface portion of the driving ring 24. Accordingly, the slider 27 remains at the movement end position in the left direction as described above. At the same time, the barrier lever 29 and the moving plate 32 are stopped. Thus, the lens barrier 33 and the barrier cap 34 remain at the aforementioned opened position.

In the state in which the lens barrier 33 is positioned at the aforementioned opened position, the lens-barrel frame components, which have a mechanism for forward/backward movement thereof, such as the rotating moving frame 52, which is the outermost frame, are extended to a position where photographing can be made, through the lens opening 7a of the front metal cover 7 without being affected by the lens barrier 33.

Next, description will be made regarding the operation in which the camera is returned to the lens-barrel collapsed state and the lens barrier 33 is moved to the closed position. First, upon driving the driving motor 41 in the reverse direction, the rotating moving frame 52 is driven so as to be turned clockwise, i.e., in the reverse direction, by the turn angle θ2 and θ1 in that order, for retracting the rotating moving frame 52 from the telescopic position. The driving ring 24 is driven so as to turn counterclockwise by an angle corresponding to the turning of the rotating moving frame 52 in the reverse direction. Then, the following pin 27b of the slider 27 is pressed by the protrusion 24d, and is engaged with the notch 24c of the driving ring 24 again.

Subsequently, upon turning the driving ring 24 counterclockwise corresponding to the turning of the rotating moving frame 52 in the clockwise direction by the turn angle θ0, the slider 27 is moved toward the right. During the movement of the slider 27, the barrier lever 29 is turned clockwise with the driving pin 27c of the slider 27 and the cam groove 29b of the barrier lever 29 being in contact with each other by the force of the charged torsion spring 31 (i.e., the barrier lever 29 is turned clockwise by the force of the charged torsion spring 31). The turning of the barrier lever 29 leads to movement of the moving plate 32, the lens barrier 33, and the barrier cap 34 in the right direction.

The slider 27 is moved in the right direction so as to slide up to the initial position. Then, the right edge 34a of the perimeter of the barrier cap 34 comes in contact with the right edge 7a1 of the perimeter of the lens opening 7a of the front metal cover 7, whereby the movement of the lens barrier 33 in the right direction stops. However, the moving plate 32 is further moved in the right direction by a predetermined movement amount. At that time, each of the contact portions 33c of the lens barrier 33 moving relative to the moving plate 32 slides upward to the top of the corresponding protrusion 32g of the moving plate 32 along the right side face thereof against the force toward the rear side in the Z direction by the force of the spring portion 32d. Then, the moving plate 32 comes in contact with the stepped portion provided to the lens barrier 33 at the right end on the rear face thereof and stops.

The action in which the contact portions 33c slide upward leads to fitting of the barrier cap 34 into the lens opening 7a of the front metal cover 7, whereby the face of the barrier cap 34 and the face of the metal cover 7 form a single surface, whereby the barrier cap 34 is returned to the barrier closed position.

Subsequently, the driving ring 24 is further turned slightly counterclockwise and only the slider 27 is stroked in excess, thereby ensuring movement of the lens barrier 33 and the moving plate 32 to the aforementioned barrier closed position. Subsequently, the driving ring 24 is stopped. In the stationary state, the torsion spring 31 is slightly charged, and the driving pin 27c of the slider 27 is slightly distanced from the cam portion 29b of the barrier lever 29, i.e., a small gap is formed therebetween. At that time, the rotating moving frame 52 is also returned to the aforementioned initial turn position P0.

In a case that the barrier closing action of the barrier unit 2 is hindered by an external force G applied from the right side of the lens barrier 33 as shown in FIG. 14, the moving plate 32 is pressed toward the left by the lens barrier 33, and the barrier lever 29 is turned counterclockwise while charging the torsion spring 31. The external force G is absorbed by the charged spring, thereby preventing deformation of the barrier unit 2 and damage of the gear of the driving motor 41 and so forth.

With the opening/closing actions of the barrier unit 2 described above, in a case of the turning of the barrier lever 29 in the counterclockwise direction, the barrier lever 29 is turned by the driving pin 27c of the slider 27 pressing the cam portion 29b of the barrier lever 29 on the other hand, in a case of the turning of the barrier lever 29 in the clockwise direction, the barrier lever 29 is turned with the cam portion 29b of the barrier lever 29 following the driving pin 27c of the slider 27, or with the cam portion 29b of the barrier lever 29 and the driving pin 27c of the slider 27 slightly distanced from one another. Accordingly, the opening angle α (FIG. 9) of the torsion spring 31 is not greatly changed during the aforementioned actions. In other words, the charged state of the torsion spring is hardly changed. This provides the advantage of markedly small energy consumption of the driving motor 41 for driving the barrier unit 2 as compared with conventional barrier driving units which greatly change the charged state of a spring member during driving actions.

Next, description will be made regarding a configuration of the lens barrel 3 with reference to disassembled perspective views of the lens barrel shown in FIGS. 1, 4, and 5.

The lens barrel 3 comprises: the fixed frame 51 which is a first frame fixed to and held by the front main body 5; the rotating moving frame 52 which is a second frame and which can be rotated and moved forward/backward; a moving frame 53 having a structure which allows linear movement thereof along with a cam frame 55 while inhibiting rotation thereof; a first frame 54 having a structure which allows linear movement thereof while inhibiting rotation thereof and which is driven and moved forward/backward by the cam frame 55; the cam frame 55 which is a fourth frame having a function which allows rotation and forward/backward movement thereof, and which is driven and moved forward/backward by a linear-action frame 58; a focus frame 56 which is a member for holding a first group lens holding frame 72 holding the first group lens 71 serving as a photographing lens in a manner which allows forward/backward movement thereof, and which is fixed to and held by the first frame 54; a second group frame 57 which is a frame member having a structure that allows forward/backward movement thereof while inhibiting rotation thereof, and which holds a second lens holding frame 74 holding second group lens 73 serving as a photographing lens, and which is driven and moved forward/backward by the cam frame 55; the linear-action frame 58 which is a frame member having a structure that allows linear movement thereof while inhibiting rotation thereof, and which is a third frame that is moved forward/backward along with the rotating moving frame 52; a key ring 59 which is a movable frame member for guiding the linear movement of the second group frame 57; a flare diaphragm 60 which is a diaphragm member adhered to the key ring 59 for forming a diaphragm unit and a flare diaphragm 69 adhered to the linear-action frame 58 (FIGS. 18 and 19); and a CCD holding frame 61 fixed to and held by the fixed frame 51.

The fixed frame 51 is a cylindrical frame member. The fixed frame 51 includes: serving as rotation/movement control means a helicoid thread (female thread) 51*b* provided to a second region; a side-face helicoid thread 51*a* provided to the end of a first region; a circumferential insertion portion 51*i* provided on the front end of the helicoid thread 51*b* along the inner circumference; three slant guide grooves 51*c* communicating with the circumferential insertion portion; and three circumferential guide grooves 51*d* provided to a third region along the circumference so as to communicate with the communicating guide grooves, on the inner-circumferential-surface portion thereof. Furthermore, the fixed frame 51 includes three linear-action guide grooves 51*e* each of which has an opening communicating with the rear-end face.

Furthermore, the fixed frame 51 includes the gear chamber 51*g* at a position on the outward thereof, which has an opening that communicates with the inner-circumferential-surface portion side of the fixed frame 51. The gear chamber 51*g* has a shaft holding opening 51*h* on the front face thereof. The lens barrel driving gear 44 is rotatably held by and stored in the gear chamber 51*g* with one shaft 44*a* thereof fit to the shaft holding opening 51*h* and with the other shaft 44*b* fit to a shaft holding opening 61*c* formed on the CCD holding frame 61.

A waterproof seal ring 65 having a V-shaped cross-section is fixed to the front end of the outer-circumferential-surface portion of the fixed frame 51 for waterproof. Upon fixing the fixed frame 51 to the front main body 5, the outer-circumferential-surface portion of the waterproof seal ring 65 is pressed into contact with the fixed-frame mounting inner circumferential surface of the front main body 5.

The rotating moving frame 52 is a cylindrical member. The rotating moving frame 52 includes: an outer-circumferential-surface gear portion 52*a* which has spur-shaped gear teeth and is provided on a part of the outer-circumferential-surface on the rear side thereof; a helicoid thread (male thread) 52*b* serving as rotation/movement control means on the other part of the outer circumferential surface thereof; and three protrusions 52*c* serving as rotation/movement control means provided so as to be distanced from one another on the front side in the Z direction with respect to the gear portion 52*a* and the helicoid thread 52*b*. Furthermore, the rotating moving frame 52 includes: a circumferential groove 52*d* for a bayonet mechanism serving as cam frame driving means which is provided along the inner circumference, and which has an opening communicating with the rear side; a circumferential groove 52*e* for the bayonet mechanism which is provided along the inner circumference so as to be distanced from the circumferential groove 52*d* in the Z direction by a predetermined distance, and which has an opening communicating with the rear side; two linear-action grooves 52*f* serving as cam frame driving means which are connected to (communicate with) the circumferential groove 52*d*, and which have an opening communicating with the rear side; a linear-action groove 52*g* serving as cam frame driving means which is provided in the Z direction, and which is connected to (communicates with) the circumferential groove 52*d* while having an intersection with the circumferential groove 52*e*, on the inner circumferential surface on the rear side thereof (FIG. 23). Furthermore, the rotating moving frame 52 includes a portion where the circumferential groove 52*d* is connected to the linear-action groove 52*g*, i.e., a groove wall 52*h* for the clockwise turning (FIG. 23).

The metallic cap 62 is fit into and adhered to the outer-circumferential-surface portion of the rotating moving frame 52. Furthermore, a waterproof seal ring 66 having a V-shaped cross-section is adhered and fixed to the front end of the inner circumferential surface of the rotating moving frame 52.

The moving frame 53 is a cylindrical frame member. The moving frame 53 includes linear-action protrusions 53*a* on the rear side of the outer circumferential surface. Furthermore, the moving frame 53 includes a circumferential groove 53*b* and a linear-action groove 53*d* on the rear side of the inner circumferential surface thereof.

A metallic cap 63 is fit into and adhered to the outer-circumferential-surface portion of the moving frame 53. Furthermore, a waterproof seal ring 67 having a V-shaped cross-section is adhered and fixed to the front end of the inner circumferential surface of the rotating moving frame 53.

The first group frame 54 is a cylindrical frame member including a ring portion having a lens opening on the front side thereof. The first group frame 54 includes a linear-action protrusion 54*d* on the rear side of the outer circumferential surface thereof. Furthermore, a cam follower 54*c* is fixed to a pin opening 54*e* provided on the rear side of the inner circumferential surface. The focus frame 56 is fixed to the inner side of the ring portion of the first group frame 54 with a screw which is inserted to and passes through a screw insertion opening 54*b* provided to the ring portion and which is screwed into a screw opening 56*a*.

The focus frame 56 includes a built-in focusing driving mechanism, including a focusing motor 70, therewithin. The focus frame 56 is a frame member having a structure which allows forward/backward movement thereof by actions of the aforementioned focusing driving mechanism. Furthermore, the focus frame 56 holds the first group lens holding frame 72 holding the first group lens 71 in a manner which allows movement thereof forward and backward.

A metallic cap 64 is fit into and adhered to the outer-circumferential-surface-portion of the first group frame 54. Furthermore, a panel 68 is adhered and fixed to the ring portion on the front side of the first group frame 54.

The cam frame 55 is a cylindrical frame member. The cam frame 55 includes: three cam followers 55*a* on the stepped outer-circumferential-surface portion on the rear side thereof, which serves as rotation control means for the cam frame (fourth frame), and each of which has a substantially parallelogram cross-sectional shape with two side faces slanting to the optical axis O and with the other two side faces parallel to the circumferential direction; and three pin-shaped cam followers 55b0 and 55b1 serving as round-pin shaped cam frame driving means, each of which protrudes from the center of the cam follower 55a toward the outside. Furthermore, the cam frame 55 includes three guide protrusions 55c along the circumference thereof on the front side of the aforementioned stepped outer-circumferential-surface portion, each of which has a tip with a smaller height than that of the aforementioned stepped outer-circumferential-surface portion. Furthermore, the cam frame 55 has cam grooves 55d on the outer-circumferential-surface portion on the front side thereof which serve as cam means. On the other hand, the cam frame 55 has a cam groove 55e on the inner circumferential surface on the rear side. Furthermore, the cam frame 55 has cam grooves 55f on the inner-circumferential-surface portion thereof which serve as cam means.

The focus frame 56 is a frame member having a circular opening. The first group lens holding frame 72 holding the first group lens 71 is inserted to the aforementioned circular opening in a manner which allows movement thereof forward and backward along the optical axis. Furthermore, a focus motor 70 which is a stepping motor is mounted to the focus frame, thereby enabling movement of the first group lens holding frame 72 at the time of driving for focusing.

The second group frame 57 is a frame member for mounting the second group lens holding frame 74 holding the second group lens 73 therewithin. The second group frame 57 includes a shutter mechanism including a shutter actuator, and an ND filter mechanism including a filter actuator therewithin. The second group frame 57 includes cam followers 57b protruding toward the outside, and linear-action grooves 57a extending on both the side faces thereof in the Z direction.

The key ring 59 is a ring-shaped frame member having a center opening (inner-circumferential-surface portion) 59e on the face orthogonal to the moving direction (direction of the optical axis O), and an outer-circumferential-surface portion 59a. Furthermore, the key ring 59 includes three linear-action guide protrusions 59b protruding from the outer-circumferential-surface portion 59a toward the outside, and two key portions 59c extending straight from the perimeter of the opening 59e toward the front side in the Z direction.

The flare diaphragm 60 is a flexible, thin, and ring-shaped diaphragm member having a center opening 60a which is formed of a sheet member such as a polyester sheet or the like, and which has notches 60b extending in the diameter direction and notches 60c extending in the circumferential direction. The flare diaphragm 60 is fixed to the key ring 59 with three recessed mounting portions 60d provided on the outer perimeter thereof adhered to three flare diaphragm mounting portions 59d provided on the rear face of the key ring 59. The flare diaphragm 60 is a face, which is adhered to the rear face of the key ring 59, orthogonal to the moving direction of the key ring 59 (direction of the optical axis O).

In a case that the perimeter of the center opening 60a is pressed toward the front side or the rear side in the Z direction by other frame members as described later, the flare diaphragm 60 mounted on the key ring 59 elastically changes the shape thereof around the notches 60b and 60c, whereby the perimeter of the center opening 60a is displaced toward the pressing direction. This allows the flare diaphragm 60 to pass through the center opening 57e of the key ring 59 toward the front side. Furthermore, this allows the flare diaphragm 60 to be moved toward the rear side by other frame members, which relatively move with respect to the key ring 59, pressing the perimeter of the center opening 60a through protruding components provided on the center thereof.

The linear-action frame 58 is a cylindrical frame member. The linear-action frame 58 includes linear-action guide protrusions 58a protruding from the outer circumferential surface of the rear-end flange thereof. Furthermore, the linear-action frame 58 includes five protrusions 58b serving as bayonet tabs extending in the diameter direction and the circumferential direction on the outer circumference near the rear end flange thereof. Furthermore, the linear-action frame 58 includes a protrusion 58c serving as a bayonet tab which extends in the diameter direction and the circumferential direction, and which is distanced from the protrusions 58b in the Z direction by a predetermined distance.

Note that the locations of the five protrusions 58b and the single protrusion 58c are disposed on the outer circumferential surface of the linear-action frame 58 with a suitable distribution as necessary. This prevents deformation, deviation, and damage of the linear-action frame 58 and the rotating moving frame 52 due to thrust force applied to the rotating moving frame 52 or the linear-action frame 58.

Furthermore, a flare diaphragm 69 formed of a sheet member is adhered to the rear end face of the linear-action frame 58. The flare diaphragm 69 has no mechanism which would allow change of the shape thereof in the forward/backward movement of the lens barrel 3, unlike the flare diaphragm 60.

The linear-action frame 58 includes three cam slots 58d which pass through the frame from the inner circumferential surface to the outer circumferential surface, and which serve as rotation control means for the cam frame (fourth frame). Each of the cam slots 58d is formed of: a circumference slot 58e which serves as lens-driving circumferential cam means, and which provides an idling region for the cam frame (fourth frame); a slant cam slot 58f which serves as cam means for extension, and which provides a driving region for the cam frame (fourth frame). Furthermore, the linear-action frame 58 includes: three linear-action grooves 58h opening to the rear side; and three linear-action guide grooves 58g opening to the front side, on the inner-circumferential-surface portion thereof.

A CCD holding plate is fixed to the CCD holding frame 61. Note that the CCD holding plate holds a CCD 82, which is an image-capturing device, and an optical filter 81. The CCD holding frame 61 includes a CCD opening 61a provided in front of the CCD 82 and the optical filter 81, and a fitting portion 61b to be fit to the inner-circumferential-surface portion of the rear side of the fixed frame 51.

Next, description will be made regarding mounting of each of the aforementioned components of the lens barrel 3 and the fitting state thereof.

Note that Table 1 shows the combinations of the components which are engaged with each other or fit to each other in the assembled state of the lens barrel 3. In the Table, the reference character within the symbol "( )" denotes the reference character within the symbol "( )" shown in FIGS. 4 and 5, and represents the combination of the components which have the relation of engagement or fitting therebetween.

TABLE 1

| Reference character in "( )" in FIGS. 4 and 5 | Combination of the components engaging with each other or fitting to each other | |
|---|---|---|
| A | shaft portion 44a of lens barrel driving gear 44 | shaft holding opening 51h of fixed frame 51 |
| B | shaft portion 44b of lens barrel driving gear 44 | shaft holding opening 61c of CCD holding frame 61 |
| C | helicoid thread (female) 51b of fixed frame 51 | helicoid thread (male) 52b of rotating moving frame 52 |
| E | protrusion 52c of rotating moving frame 52 | slant groove 51c and circumferential guiding groove 51d of fixed frame 51 |
| G | linear-action groove 51e of fixed frame 51 | linear-action guiding protrusion 58a of linear-action frame 58 |
| I | circumferential groove 52d of rotating moving frame 52 | protrusion 58b of linear-action frame 58 |
| J | circumferential groove 52e of rotating moving frame 52 | protrusion 58c of linear-action frame 58 |
| K | linear-action groove 52f of rotating moving frame 52 | cam follower 55b0 of cam frame 55 |
| L | linear-action groove 52g of rotating moving frame 52 | cam follower 55b1 of cam frame 55 |
| M | linear-action guiding protrusion 53a of moving frame 53 | linear-action guiding groove 58g of linear-action frame 58 |
| N | circumferential groove 53b of moving frame 53 | guiding protrusion 55c of cam frame 55 |
| Q | linear-action guiding groove 53b of moving frame 53 | linear-action guiding protrusion 54d of first group frame 54 |
| R | cam follower 54c of first group frame 54 | cam groove 55d of cam frame 55 |
| S | cam follower 57b of second group frame 57 | cam groove 55f of cam frame 55 |
| T | circumferential groove 55e of cam frame 55 | outer-circumferential-surface portion 59a of key ring 59 |
| U | cam follower 55a of cam frame 55 | cam groove 58d of linear-action frame 58 |
| V | key portion 59c of key ring 59 | linear-action groove 57a of second group frame 57 |
| W | linear-action guiding protrusion 59b of key ring 59 | linear-action guiding groove 58h of linear-action frame 58 |

First, the cam frame 55, the first group frame 54, the second group frame 57, the key ring 59, and the moving frame 53 are mounted and fit to the linear-action frame 58.

Specifically, the first group frame 54 is fit to the outer-circumferential-surface portion of the cam frame 55 in a manner which allows both relative rotation and relative forward/backward movement thereof, with the cam follower 54c slidably fit to a cam groove 55d formed on the cam frame 55. The focus frame 56 fixed to the first group frame 54 is inserted into the inner-circumferential-surface portion of the cam frame 55. The focus frame 56 fixed to the first group frame 54 is inserted into the inner-circumferential-surface portion of the cam frame 55. The second group frame 57 is fit to the inner-circumferential-surface portion of the cam frame 55 in a manner which allows both relative rotation and relative forward/backward movement thereof with the cam followers 57b slidably fit to the cam grooves 55f.

The key ring 59 is inserted to the inner-circumferential-surface portion of the cam frame 55 from the rear side thereof with the outer-circumferential-surface portion 59a rotatably fit to a circumferential groove 55e formed on the inner circumferential surface of the cam frame 55, and with the key portions 59c slidably fit to the linear-action grooves 57a of the second group frame 57.

With regard to the cam frame 55, the aforementioned stepped outer-circumferential-surface portion thereof is fit into the inner circumferential surface of the linear-action frame 58 from the rear side thereof in a manner which allows both relative rotation and relative forward/backward movement thereof therebetween. Furthermore, the cam followers 55a of the cam frame 55 are slidably fit to the cam slots 58d.

The moving frame 53 is fit to the first group frame 54 from the front side thereof in a manner which allows both relative rotation and relative movement forward/backward therebetween, with the linear-action protrusion 54d of the first group frame 54 slidably fit to the linear-action groove 53d. Furthermore, the guide protrusions 55c formed on the cam frame 55 are slidably fit to the circumferential groove 53b of the moving frame 53. Then, the linear-action guide protrusions 53a of the moving frame 53 are slidably fit to the linear-action guide grooves 58g of the linear-action frame 58. The linear-action guide protrusions 59b of the key ring 59 are slidably fit to the linear-action grooves 58h of the linear-action frame 58. Thus, the key ring 59 is held by the linear-action frame 58 in a manner which allows relative movement therebetween while inhibiting relative rotation therebetween.

The linear-action frame 58, to which the cam frame 55 and so forth have been mounted and inserted, is inserted to the inner circumferential surface of the rotating moving frame 52 from the rear side in a manner which allows relative rotation and integral movement in the Z direction (direction of the optical axis O), with the protrusion 58b slidably fit to the circumferential groove 52d, and with the protrusion 58c slidably fit to the circumferential groove 52e. In this fitting state, the two pin-shaped cam followers 55b0 of the cam frame 55 are slidably fit to the circumferential groove 52d of the rotating moving frame 52. Furthermore, upon relatively turning the rotating moving frame 52, the two pin-shaped cam followers 55b0 are moved to positions which allow the two pin-shaped cam followers 55b0 to be moved into the linear-action grooves 52f. On the other hand, the single pin-shaped cam follower 55b1 of the cam frame 55 is slidably fit to the circumferential groove 52d of the rotating moving frame 52 in the first stage. Next, upon relatively turning the rotating moving frame 52, the pin-shaped cam follower 55b1 is moved to a position which allows the pin-shaped cam follower 55b1 to move into the linear-action groove 52g.

The rotating moving frame 52, to which the linear-action frame 58 and so forth have been mounted, is fit to the inner circumferential surface of the fixed frame 51 in a manner which allows both rotation and forward/backward movement thereof with the helicoid thread 52b and the helicoid thread 51b screwed one to the other. Furthermore, the protrusions 52c of the rotating moving frame 52 are slidably fit to the slant guide grooves 51c and the circumferential guide grooves 51d of the fixed frame 51. Moreover, the linear-action guide protrusions 58a of the linear-action frame 58 are slidably fit to the linear-action guide grooves 51e formed on the fixed frame 51.

Then, the lens barrel driving gear 44 meshes with the gear portion 52a of the rotating moving frame 52, whereby the rotating moving frame 52 is driven and turned by the lens barrel driving gear 44.

The CCD holding frame 61, to which the optical filter 81 and the CCD 82 have been mounted, is fixed to the fixed frame 51 to which the rotating moving frame 52 and so forth have been mounted, with an inner-circumferential-surface fitting portion 61b fit into an inner-circumferential-surface portion 51f provided on the rear side of the fixed frame 51.

Description will be made regarding a waterproof mechanism around the lens barrel 3. The connection between the fixed frame 51 and the front main body 5, and the sliding portion between the fixed frame 51 and the metallic cap 62 mounted to the rotating moving frame 52 are sealed waterproof by the waterproof seal ring 65 fixed to the front end of the fixed frame 51. The sliding portion between the inner-circumferential-surface portion of the rotating moving frame 52 and the metallic cap 63 mounted to the moving frame 53 is sealed waterproof by the waterproof seal ring 66 fixed to the front end of the rotating moving frame 52. Furthermore, the sliding portion between the inner-circumferential-surface portion of the moving frame 53 and the metallic cap 64 mounted to the first group frame 54 is sealed waterproof by the waterproof seal ring 67 fixed to the front end of the moving frame 53. Thus, the connection between the lens barrel 3 and the fixed frame 51 is waterproof.

With regard to the aforementioned lens barrel 3, upon driving and rotating the rotating moving frame 52 by the lens barrel driving gear 44, the rotating moving frame 52 is turned by a predetermined angle with respect to the fixed frame 51 without movement forward/backward, for driving of the barrier in the first stage. Subsequently, the rotating moving frame 52 is extended forward by actions of the helicoid thread 51b while being turned. Each lens barrel frame moves forward/backward or turns following the turning of the rotating moving frame 52 as follows.

The linear-action frame 58 is linearly moved forward/backward along with the rotating moving frame 52 while inhibiting rotation thereof following the linear-action guide grooves 51e of the fixed frame 51. The moving frame 53 is moved forward/backward with rotation thereof inhibited by the linear-action guide grooves 58g. With such a mechanism, the moving frame 53 performs the same linear movement forward/backward as with the cam frame 55, which performs both the linear forward/backward movement and rotation, through the guide protrusions 55c as with the cam frame 55.

The cam frame 55 is stationary during the turning of the rotating moving frame 52 in the predetermined angle range in the first stage described above. Subsequently, upon further turning the rotating moving frame 52, the cam frame 55 is moved forward/backward and is turned following the cam slots 58d of the linear-action frame 58. The first group frame 54 is driven so as to move forward/backward integrally with the focus frame 56 following the cam groove 55d of the cam frame 55 with rotation thereof inhibited by the linear-action groove 53d of the moving frame 53. Note that the second group frame 57 performs the same forward/backward movement thereof as with the focus frame 56. The second group frame 57 is moved forward/backward following the cam grooves 55f of the cam frame 55 with the turning thereof inhibited by the linear-action guide groove of the linear-action frame 58 and the key ring 59 which moves forward/backward as a single unit along with the linear-action frame 58.

Next, description will be made regarding the change in the shape of the flare diaphragm 60 in the movement of the lens barrel 3 forward/backward, with reference to FIG. 1 and FIGS. 19 through 21.

Figure 19:
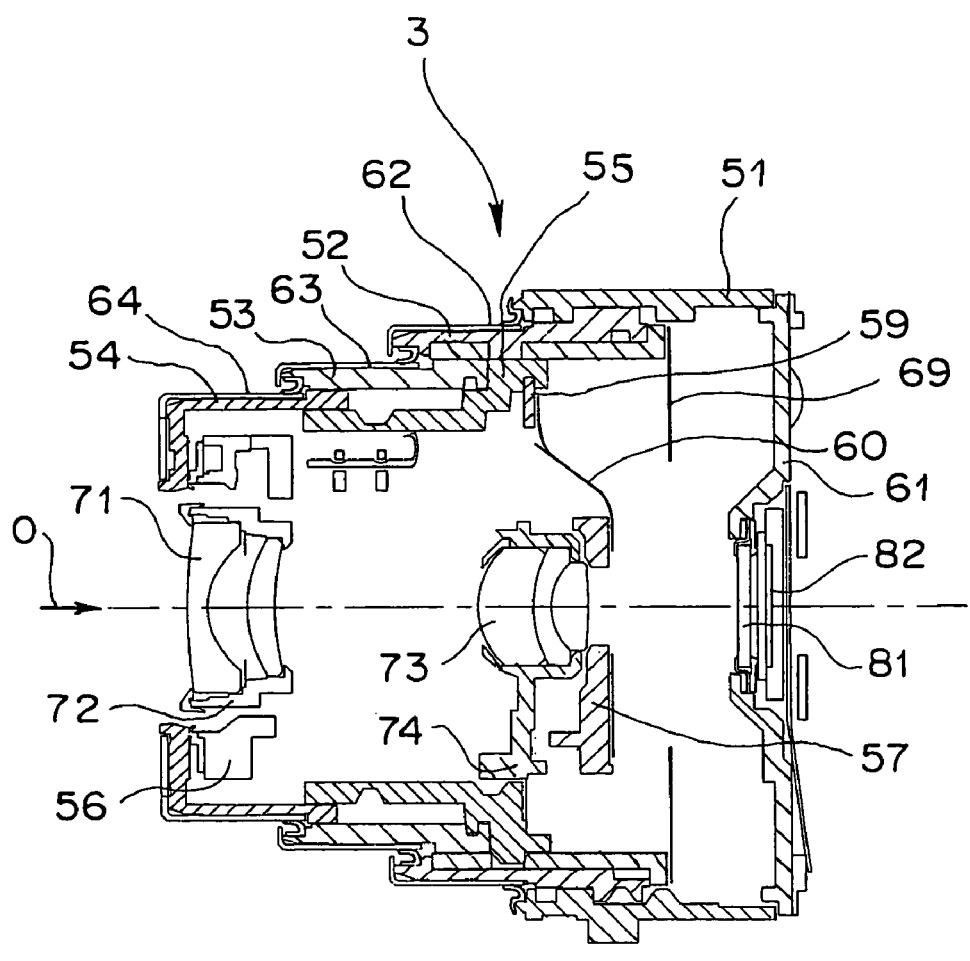
FIG. 19 is a longitudinal sectional view of the lens barrel shown in FIGS. 4 and 5, in the wide-angle state, through a plane including the optical axis.
Figure 20:
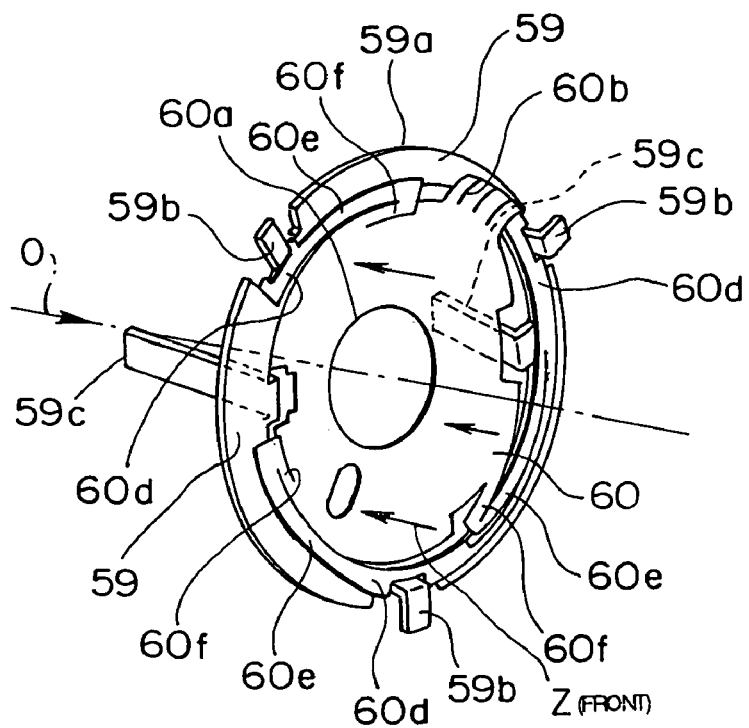
FIG. 20 is a perspective view of a floating key and a flare diaphragm applied to the lens barrel shown in FIGS. 4 and 5, with the perimeter of the center opening of the flare diaphragm being pressed toward the front side.
Figure 21:
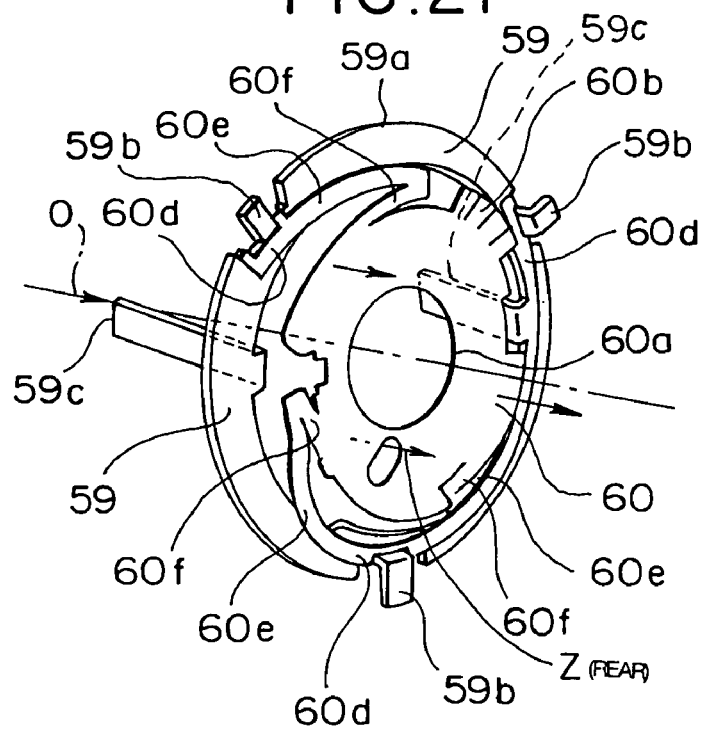
FIG. 21 is a perspective view of the floating key and the flare diaphragm applied to the lens barrel shown in FIGS. 4 and 5, with the perimeter of the center opening of the flare diaphragm being pressed toward the rear side.

Note that FIG. 19 is a longitudinal sectional view which shows the lens barrel of the aforementioned camera in the wide-angle state through a plane including the optical axis. FIGS. 20 and 21 are perspective views showing the key ring 59 and the flare diaphragm 60 applied to the aforementioned lens barrel. Specifically, FIG. 20 shows the flare diaphragm with the perimeter of the center opening thereof pressed and bent toward the front side. FIG. 21 shows the flare diaphragm with the perimeter of the center opening thereof pressed and bent toward the rear side.

The flare diaphragm 60 is adhered to and fixed to the rear face of the key ring 59 fit to the rear-side portion of the cam frame 55. In the lens-barrel collapsed state in which the lens barrel 3 is collapsed as shown in FIG. 1, the protruding components provided around the opening 61a of the CCD holding frame 61, which is a second frame member, are inserted into the opening 59e of the key ring 59. At that time, the flare diaphragm 60 is in contact with the protruding components around the opening 60a. This changes the shape of the notched portion 60b of the flare diaphragm 60 as well as changing the shape of strip-shaped portion 60e and 60f formed by notches 60c provided along the circumference thereof, as shown in FIG. 20. This leads to the displacement of the perimeter of the opening 60a of the flare diaphragm 60 toward the front side, thereby allowing the perimeter of the opening 60a of the flare diaphragm 60 to pass through the opening 59e of the key ring 59 as shown in FIG. 20. This allows the protruding components around the opening 61a of the CCD frame 61 to be inserted into the opening 59e of the key ring 59, as described above.

On the other hand, in a case that the lens barrel 3 is in the wide-angle state, the rear-end face of the second group frame 57, which is a first frame member, is farther protruded to the rear side than the key ring 59 as shown in FIG. 19. In this state, the flare diaphragm 60 is in contact with the rear-end face of the second group frame 57. This changes the shape of the notched portion 60b of the flare diaphragm 60 as well as changing the shape of strip-shaped portions 60e and 60f formed by notches 60c as shown in FIG. 21. This leads to a change in the shape of the perimeter of the opening 60a of the flare diaphragm 60 toward the rear side. This allows the state in which the rear-end face of the second group frame 57 is farther protruded to the rear side than the opening 59e of the key ring 59 as described above.

Next, description will be made regarding the forward/backward movement of the lens barrel 3 having the aforementioned configuration included in the camera 1, as well as the opening/closing actions of the barrier unit 2, with reference to FIG. 1, FIGS. 15 through 19, FIGS. 22 through 24, and so forth.

Figure 22C:
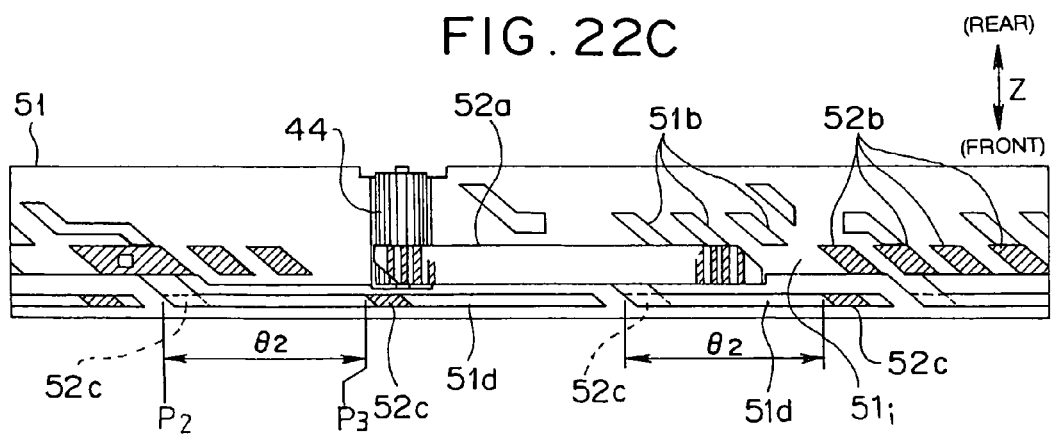
FIG. 22C is an operation-state development view in which a partial development view showing the outer-circumferential-surface gear portion, the helicoid thread (male thread), and the protrusions of the rotating moving frame is superimposed on a development view showing the inner circumferential surface of the fixed frame and the lens barrel driving gear included in the lens barrel shown in FIGS. 4 and 5, and which shows the lens barrel of the camera from the wide-angle state to the telescopic state.

FIGS. 22A through 22C are operation-state development views as viewed from the inner-circumferential-surface side in which a partial development view showing the outer-circumferential-surface gear portion, the helicoid thread (male thread), and the protrusions of the aforementioned rotating moving frame is superimposed on a development view showing the inner circumferential surface of the aforementioned fixed frame and the lens barrel driving gear included in the aforementioned lens barrel. Specifically, FIG. 22A shows the state of the lens barrel in the early stage of driving thereof in which the camera is in the lens-barrier closed state and the lens-barrel collapsed state. FIG. 22B shows the state of the lens barrel when the camera is in the barrier-opened state, the lens-barrel collapsed state, and the state (wide-angle state) in which the lens barrel has been extended. FIG. 22C shows the state of the lens barrel when the camera enters the telescopic state from the wide-angle state with respect to the lens barrel. FIG. 23 is an operation-state development view as viewed from the inner-circumferential-surface side, in which a diagram showing the cam follower of the cam frame and the cam groove of the linear-action frame is superimposed on a development view showing the inner-circumferential-surface portion of the rotating moving frame of the aforementioned lens barrel. Specifically, FIG. 23 shows the state in which the barrier has been closed and the lens barrel has been collapsed, the state in which the barrier has been opened and the lens barrel has been collapsed, the state in which the barrier has been opened and extension of the lens barrel is in the early stage, the state in which the barrier has been opened and the extension of the lens barrel has been completed, and the state in which the barrier has been opened and the lens barrel is in the zoom state (telescopic state). FIG. 24 is a development view which shows the cam follower and the cam groove of the cam frame included in the aforementioned lens barrel as viewed from the outer-circumferential-surface side.

Description will be made below regarding the operation of the camera 1 from the state in which the barrier has been closed and the lens barrel has been collapsed as shown in FIGS. 1 and 15, up to the state in which the barrier has been opened and the lens barrel remains collapsed. Upon driving the driving-motor 41 in the forward direction, the rotating moving frame 52 is turned via the lens barrel driving gear 44 from the initial position (position where the barrier has been closed and the lens barrel has been collapsed) P0 counterclockwise by the angle θ0 (corresponding to the first region) (in the direction D1 in FIG. 4). At the same time, the driving ring 24 is also driven so as to turn by an angle corresponding to the angle θ0, synchronously with the turning of the rotating moving frame 52 (the turning in the direction D3 in FIG. 2). Thus, the lens barrier 33 of the barrier unit 2 is moved from the closed position (protection position) shown in FIGS. 1 and 15 up to the opened position (lens-barrier retracted position) shown in FIG. 17.

Description will be made regarding the lens barrel 3. Let us say that the lens barrel 3 is positioned at the initial position P0 shown in FIG. 22A. In this state, the helicoid thread (female thread) 51b is not engaged with any thread of the rotating moving frame 52. Then, upon turning the rotating moving frame 52 counterclockwise by the angle θ0 (corresponding to the first region), the lens barrel 3 reaches the position P1 where the barrier has been opened and the lens barrel remains collapsed as shown in FIG. 22B. At this position P1, the lens barrel 3 enters the state in which the helicoid thread (male thread) 52b comes in contact with the end face of the helicoid thread (female thread) 51a. In the aforementioned range of the turn angle θ0, the helicoid thread 52b has not yet been engaged with any thread of the fixed frame 51, and accordingly, the rotating moving frame 52 is not extended along the optical axis O (the rotating moving frame 52 remains at the collapsed position).

On the other hand, when the rotating moving frame 52 is positioned at the initial position P0, the five protrusions 58b and the single protrusion 58c of the linear-action frame 58 are slidably fit to the circumferential grooves 52d and 52e of the rotating moving frame 52, respectively, at all times. Furthermore, the pin-shaped cam followers 55b0 and 55b1 are fit to the circumferential groove 52d and 52e (the state of the rotating moving frame 52 (P0) in FIG. 23).

Then, upon turning the rotating moving frame 52 by the angle θ0 (turn up to the position P1), the pin-shaped cam follower 55b0 is relatively moved following the circumferential groove 52d, whereby the pin-shaped cam follower 55b0 faces the linear-action groove 52f of the rotating moving frame 52 along the optical axis.

Figure 23:
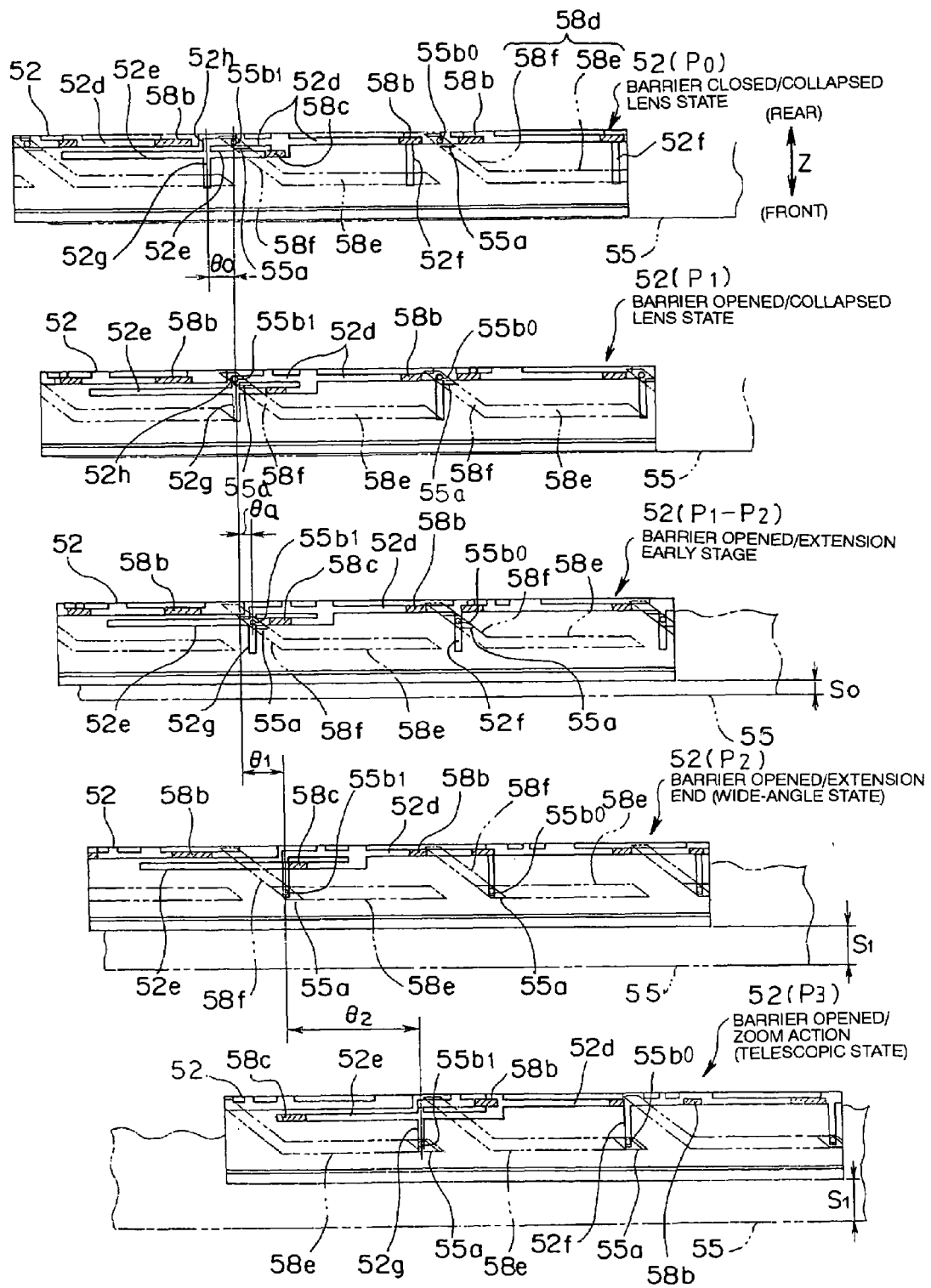
FIG. 23 is an operation-state development view in which a cam follower of a cam frame and a cam groove of a linear-action frame are superimposed on a development view showing the inner-circumferential-surface portion of the rotating moving frame of the lens barrel shown in FIGS. 4 and 5, and which shows: from the state in which the barrier is closed and the lens barrel is collapsed to the state in which the barrier is opened and the lens barrel is collapsed; to the state in which the barrier is opened and the lens-barrel extension state in the early stage; to the state in which the barrier is opened and extension of the lens barrel has been completed; and to the state in which the barrier is opened and the lens barrel is in the zoom state (telescopic state).
Figure 24:
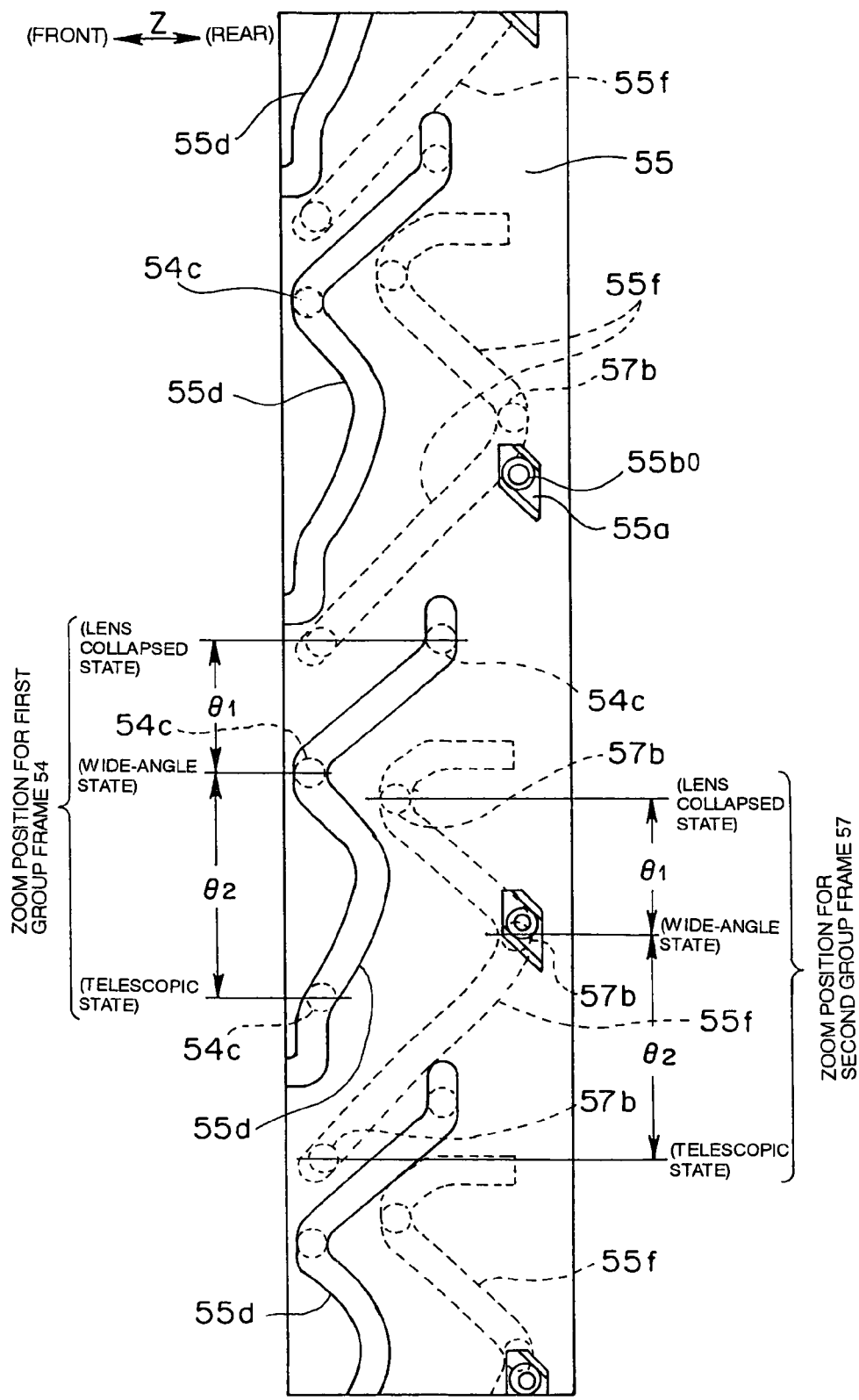
FIG. 24 is a development view which shows the cam follower and the cam groove of the cam frame included in the lens barrel shown in FIGS. 4 and 5, as viewed from the outer-circumferential-surface side.

On the other hand, the pin-shaped cam follower 55b1 is relatively moved following the circumferential groove 52d, and comes in contact with the face of the groove wall 52h of the circumferential groove 52d, whereby the pin-shaped cam follower 55b1 faces the linear-action groove 52g of the rotating moving frame 52 connected to the face of the groove wall 52h, along the optical axis O (the state of the rotating moving frame 52 (P1) in FIG. 23).

As described above, upon turning the rotating moving frame 52 by the angle θ0, the pin-shaped cam followers 55b0 and 55b1 of the cam frame 55 remain in the circumferential groove 52d. This leads to no movement of the cam frame 55 along the optical axis O. Furthermore, the cam frame 55 is not turned with respect to the linear-action frame 58. Accordingly, the cam followers 55a of the cam frame 55 remain at the rear end of the slant cam slots 58f of the cam slots 58d of the linear-action frame 58.

Accordingly, the linear-action frame 58 is not moved along the optical axis. Furthermore, the first group frame 54 is not moved forward/backward. In other words, all the components of the lens barrel 3 are not extended along the optical axis O, i.e., remain at the lens-barrel collapsed position. Thus, the opening/closing actions of the lens barrier 33 are not affected by the lens barrel 3.

Next, let us say that the rotating moving frame 52 is driven so as to turn counterclockwise from the position P1 where the barrier has been opened and the lens barrel has been collapsed up to the position P2 where the barrier has been opened and extension of the lens barrel has been completed, i.e., the rotating moving frame 52 is turned in the turn angle range θ1 (the second range). In this state, with regard to the rotating moving frame 52, the helicoid thread 52b (male thread) thereof comes in contact with the end face of the helicoid thread (female thread) 51a, and receives force in the direction of the extension. This leads to the state in which the helicoid thread (male thread) 52b is engaged with the helicoid thread (female thread) 51b. In this state, the rotating moving frame 52 starts to be extended along the optical axis O while turning (FIG. 22B). Note that the direction H shown in FIG. 22B represents the movement direction of the rotating moving frame 52 on the development view.

On the other hand, the protrusions 58b and 58c of the linear-action frame 58 are fit to the circumferential grooves 52d and 52e of the rotating moving frame 52. Accordingly, the linear-action frame 58 is extended forward along with the rotating moving frame 52 while inhibiting rotation thereof. At the start of the extension, the lens barrier 33 has been moved to the opened position (lens-barrier retracted position) as shown in FIG. 17. Accordingly, the extension of the lens barrel is not affected by the lens barrier 33.

On the other hand, the pin-shaped cam follower 55b1 receives force, so as to turn counterclockwise from the groove wall 52h formed on the linear-action groove 52g of the rotating moving frame 52, due to the aforementioned turn of the rotating moving frame 52. Thus, the cam frame 55 starts to turn counterclockwise along with the rotating moving frame 52 as a single unit (the state of the rotating moving frame 52 (P1) in FIG. 23).

Upon the start of the turning of the cam frame 55 in the counterclockwise direction, each cam follower 55a is moved so as to slide in the cam-frame driving region, i.e., the slant cam slot 58f of the cam slot 58d of the linear-action frame 58. Thus, the cam frame 55 starts relative extension thereof along the optical axis O with respect to the linear-action frame 58. At the same time, the moving frame 53 connected to the cam frame 55 with the guide protrusions 55c is extended along the optical axis O without rotation thereof.

On the other hand, the first frame 54 and the focus frame 56 starts relative extension thereof with respect to the cam frame 55 so as to be positioned at the wide-angle position through the cam groove 55d and the cam follower 54c. Also, the second group frame 57 starts relative extension thereof with respect to the cam frame 55 so as to be positioned at the wide-angle position through the cam grooves 55f and the cam followers 57b (FIG. 24).

The start of extension of the cam groove 55 leads to a situation in which the pin-shaped cam follower 55b1 moves into the linear-action groove 52g of the rotating moving frame 52. At the same time, the pin-shaped cam follower 55b0 moves into the linear-action groove 52f of the rotating moving frame 52.

Subsequently, the pin-shaped cam followers 55b1 and 55b0 receive turning-driving force from the linear-action grooves 52g and 52f of the rotating moving frame 52, thereby turning the cam frame 55 counterclockwise. At the same time, the cam followers 55a are moved so as to slide following the slant cam slots 58f of the linear-action frame 58.

Let us say that the rotating moving frame 52 is turned by a turn angle θa within the turn angle range θ1 from the position P1 where the barrier has been opened and the lens barrel remains collapsed, whereby the cam frame 55 is extended by an extension amount S0 (the state of the rotating moving frame 52 (P1-P2) in FIG. 23). In this state, the pin-shaped cam follower 55b1 moving in the linear-action groove 52g of the rotating moving frame 52 reaches the intersection of the linear-action groove 52g and the circumferential groove 52e.

At that time, the other pin-shaped cam follower 55b0 is guided by the linear-action groove 52f having no intersection, thereby allowing normal rotation and extension of the cam frame 55 without the pin-shaped cam follower 55b1 departing from the linear-action groove 52g.

Next let us say that the rotating moving frame 52 has been turned by the turn angle range θ1 (second region), i.e., the rotating moving frame 52 has reached the position P2 (wide-angle position) where the barrier has been opened and extension of the lens barrel has been completed. In this state, the rotating moving frame 52 passes through the state in which the helicoid thread 52b thereof is screwed to the helicoid thread 51b of the fixed frame 51, and enters the state in which the helicoid thread 52b thereof reaches the circumferential insertion portion 51i (FIG. 22B). The outer-circumferential-surface gear portion 52a of the rotating moving frame 52 also reaches the circumferential insertion portion 51i. Furthermore, the protrusions 52c of the rotating moving frame 52 pass through the slant guide grooves 51c of the fixed frame 51, and reaches the end (entrance end) of circumferential guide grooves 51d. Note that the linear-action frame 58 is also extended along the optical axis O, as well as the rotating moving frame 52.

On the other hand, each cam follower 55a of the cam frame 55 reaches the end of the slant cam slot 58f of the linear-action frame 58, i.e., the end (entrance end) of the circumference slot 58e (the state of the rotating moving frame 52 (P2) in FIG. 23). In this state, the cam frame 55 is relatively extended by an extension amount of S1 with respect to the linear-action frame 58 (accordingly, also with respect to the rotating moving frame 52). The moving frame 53 is also extended along with the cam frame 55.

On the other hand, as shown in the cam-groove development view in FIG. 24, the cam follower 54c and 57b are engaged with the cam grooves of the cam frame 55 and slide following the cam grooves 55d and 55f by the movement amount corresponding to the turn angle θ1 of the rotating moving frame 52. As a result, the first group frame 54 and the focus frame 56 are extended to the wide-angle position. At the same time, the second group frame 57 is extended to the wide-angle position.

As described above, with the camera 1, upon turning the rotating moving frame 52 by the turn angle of θ0 (first region), the lens barrier 33 is retracted. Subsequently, upon further turning the rotating moving frame 52 by the turn angle of θ1 (second region), each of the components of the lens barrel is extended forward, whereby the lens barrel 3 is set to the state (wide-angle extension state) in which photographing can be performed, from the lens-barrel collapsed state (FIG. 19).

Next, let us say that the rotating moving frame 52 is further driven so as to turn in the turn angle range of θ2 (third region) from the position P2 where the barrier has been opened and the extension of the lens barrel has been completed, to the position P3 where the barrier has been opened and the lens barrel has reached the zoom (telescopic) position. In this stage, the protrusions 52c of the rotating moving frame 52 move into the circumferential guide grooves 51d of the fixed frame 51, and are moved so as to slide without rattle in the movement thereof. Furthermore, the helicoid thread 52b and the outer-circumferential-surface gear portion 52a pass through the circumferential insertion portion 51i of the fixed frame 51.

When the protrusions 52c of the rotating moving frame 52 is guided and rotated following the circumferential guide grooves 51d on the fixed frame 51 as described above, the rotating moving frame 52 is turned without forward/backward movement thereof along the optical axis O. Furthermore, the linear-action frame 58 is kept stationary along the optical axis O, as well as the rotating moving frame 52.

On the other hand, with the cam frame 55, each cam follower 55a is moved into the circumference slot 58e of the linear-action frame 58, and is moved so as to slide without irregularities in the movement thereof. Thus, the cam frame 55 is turned without relative forward/backward movement thereof with respect to the linear-action frame 58, i.e., in the extension-standby region, as well as the rotating moving frame 52.

Upon turning the rotating moving frame 52 and the cam frame 55 in the turn angle range of θ2 without forward/backward movement of the cam frame 55 as described above, the cam follower 54c of the first group frame 54 is moved so as to slide following the cam groove 55d of the cam frame 55 as shown in FIG. 24, whereby the first group frame 54 is moved forward from the wide-angle position to the telescopic position. At the same time, the cam followers 57b of the second group frame 57 are moved so as to slide following the cam grooves 55f of the cam frame 55, whereby the second group frame 57 is moved forward from the wide-angle position to the telescopic position. FIG. 18 shows the situation in which the lens barrel 3 has been extended to the telescopic position.

Next, description will be made below regarding the operation of the camera 1 in which the camera 1 is returned to the lens-barrel collapsed state from the wide-angle state which allows photographing, and further returned to the lens-barrier closed state. Upon driving the driving motor 41 in the reverse direction, the rotating moving frame 52 is retracted to the lens-barrel collapsed position while turning clockwise by the turn angle θ1 from the position P2 to the position P1 as shown in FIG. 22B. At the same time, the other components of the lens barrel 3 are also collapsed to the lens-barrel collapsed position. During the aforementioned turn, the driving ring 24 of the barrier unit 2 is turned counterclockwise, synchronously with the turning of the rotating moving frame 52. However, in this turning range, the slider 27 is not engaged with the driving ring 24, and accordingly, the slider 27 remains at the left-side movement position. This keeps the lens barrier 33 in the opened state.

Furthermore, upon further driving the driving motor 41 in the reverse direction, the rotating moving frame 52 is turned clockwise by the turn angle θ0 from the position P1 where the barrier has been opened and the lens barrel has been collapsed, to the position P0 where the barrier has been closed and the lens barrel has been collapsed, as shown in FIG. 22A. At the same time, the driving ring 24 is further turned counterclockwise. This leads to the movement of the slider 27 toward the right, thereby moving the lens barrier 33 to the aforementioned closed position (protection position). Thus, upon turning the rotating moving frame 52 clockwise by the turn angle θ0, the camera 1 is returned to the initial state where the lens barrier has been closed and the lens barrel has been collapsed.

The camera 1 which is a waterproof camera having the lens barrier according to the present embodiment described above has a configuration in which the barrier unit 2 having a lens-barrier open/close mechanism is disposed in a space between the front face of the front main body 5 and the front metal cover 7. On the other hand, the rotary shaft member 21 for driving the barrier unit 2 is disposed so as to protrude toward the barrier unit 2 through the through hole 5*e* of the front main body 5. The barrier unit 2 is formed of components which do not require any particular waterproof mechanism. Thus, there is no need to provide any particular waterproof mechanism to the barrier unit 2.

On the other hand, the driving source and so forth of the camera 1 are stored in the space surrounded by the front main body 5 and the rear main body 6. This space is waterproof by sealing the connection between the front main body 5 and the rear main body 6, and sealing the through hole 5*e*. The through hole 5*e* is sealed waterproof by providing the O-ring 22 to the outer diameter portion of the rotary shaft member 21 to be inserted to the through hole 5*e*. This makes the space inside of the front main body 5 waterproof in a sure manner.

The lens driving unit for the forward/backward movement of the lens barrel 3 of the camera 1 according to the present embodiment is applied to a camera including a photographing lens and a lens barrier having a lens-barrier retracting mechanism in which the lens barrier is moved between the retracted position and the protection position. With the lens driving unit, in the early stage of the operation for extending the photographing lens, the rotating moving frame 52 is turned without extension of the photographing lens. During the early stage, the lens barrier 33 is retracted, following which the photographing lens is extended. That is to say, upon turning the driving motor 41 in the forward direction, the rotating moving frame 52 is turned counterclockwise in the turn angle range of θ0 (first region) in the first stage. During this turning action, the rotating moving frame 52 and the other components forming the lens barrel remain at the lens-barrel collapsed position, i.e., are not extended.

On the other hand, the barrier unit 2 is driven by the driving motor 41, synchronously with the action of the lens barrel 3, whereby the lens barrier 33 is moved to the opened position. Subsequently, upon turning the rotating moving frame 52 counterclockwise in the turn angle range of θ1 (second region), the rotating moving frame 52 and the other components forming the lens barrel 3 are extended to a position which allows photographing. Furthermore, upon further driving and turning the rotating moving frame 52 in the turn angle range of θ2 (third region), the lens barrel 3 enters the wide-angle state or the telescopic state which allows zoom driving.

Furthermore, the camera 1 according to the present embodiment does not require a dedicated driving source for driving the lens barrier, i.e., the opening/closing actions of the front shield of the photographing lens. The camera 1 allows the opening/closing actions of the lens barrier and the forward/backward movement of the components of the lens barrel using the driving motor 41 alone which is a single electric driving source. Furthermore, the camera 1 has the advantage of a small layout space required for the barrier unit and the lens barrel.

Specifically, the lens barrel 3 has a turning/linear-movement coupling configuration formed of the rotating moving frame 52, the linear-action frame 58, and the cam frame 55. In the early stage of turning of the rotating moving frame 52, the cam followers 55*b*0 and 55*b*1 are provided so as to be slidably fit to the circumferential grooves (bayonet grooves) 52*d* and 52*e* of the rotating moving frame 52. Subsequently, upon turning the rotating moving frame 52, the cam followers 55*b*0 and 55*b*1 move into the linear-action grooves 52*f* and 52*g* of the rotating moving frame 52, whereby the rotating force of the rotating moving frame 52 is transmitted to the cam frame 55.

The present embodiment has a configuration in which the linear-action groove 52*g* and the circumferential groove 52*e* forms an intersection. In general, such a configuration leads to a problem of jamming of the cam follower 55*b* sliding in the linear-action groove 52*g* at the intersection with the circumferential groove 52*e*. However, with the present embodiment, when the cam follower 55*b* approaches the intersection, another cam follower 55*b* is fit to and slides following another linear-action groove 52*f*. This restricts the position which allows rotation of the cam frame 55, and allows the cam follower 55*b* to pass through the intersection without difficulty, thereby enabling the rotating moving frame 52 to transmit the rotation thereof to the cam frame 55 without difficulty.

That is to say, while the present embodiment has a configuration in which the linear-action groove 52*g* and the circumferential groove 52*e* form an intersection, the present embodiment also has a configuration in which, when the cam follower 55*b* approaches the intersection, it is guided by a combination of the other cam follower 55*b* and the other linear-action groove 52*f*, thereby enabling the cam follower 55*b* to pass through the intersection without difficulty. Such a configuration enables a design in which the protrusion (bayonet tab) 58*c*, which is necessary from the perspective of the lens-barrel configuration, is fit to the circumferential groove (bayonet groove) 52*e* which forms an intersection with the linear-action groove 52*g*. This realizes a small-size lens barrel having a mechanism for performing forward/backward movement thereof in a sure manner.

While description has been made regarding the lens barrel 3 having a configuration in which the linear-action groove 52*g* and the circumferential groove 52*e* form an intersection, the present invention is not restricted to such an arrangement. Also, an arrangement may be made, which allows the cam follower 55*b*1 to move into the linear-action groove 52*g* from the circumferential groove 52*e* without such an intersection, without departing from the essence of the present invention, Description will be made regarding the flare diaphragm 60 serving as a diaphragm unit of the lens barrel 3 which is applied to the camera according to the present embodiment. The flare diaphragm 60 has a function which allows a change in the shape thereof because of the notches provided to the flare diaphragm 60. This enables the perimeter of the center opening 60a of the flare diaphragm 60 to be displaced toward the front side or the rear side. This allows the protruding components around the center of the CCD holding plate 61 (around the opening) to be moved forward so as to pass through the opening 59e of the key ring 59 with the perimeter of the center opening 60a of the flare diaphragm 60 also passing through the opening 59e to the front side at the time of movement of the lens barrel 3 forward/backward. Furthermore, this allows the protruding components on the rear side of the second group frame 57 to be moved toward the rear side so as to pass through the opening 59e of the key ring 59 while pressing the perimeter of the center opening 60a toward the rear side.

Thus, a lens barrel employing the flare diaphragm 60 enables design of the layout of the components forming the lens barrel with respect to the movement thereof with high degree-of-freedom, thereby improving the degree-of-freedom in optical design of the lens barrel. Furthermore, this enables design of the lens barrel with a small length along the optical axis O in the lens-barrel collapsed state.

While description has been made regarding the embodiments according to the present invention in which a diaphragm member is provided to a movable member, the present invention is not restricted to such an arrangement. Also, an arrangement may be made in which a flexible diaphragm member is provided to a fixed member, which allows other members to change the shape of the flexible diaphragm member from the front side and the rear side.

As described above, the camera according to the present invention is a waterproof camera including a lens barrier having a mechanism which allows movement thereof between the lens-barrier retracted position where the lens barrier is retracted from the front of the photographing lens and the protection position facing the photographing lens. The camera according to the present invention has the advantage of a small space occupied by a waterproof mechanism. Thus, the present invention can be applied to a small-size waterproof camera.

Furthermore, the lens barrel of the camera according to the present invention can be applied to a small-size lens barrel having a mechanism for driving and control other frame members effectively using circumferential grooves (bayonet grooves) and linear-action grooves provided to the lens barrel.

Furthermore, the diaphragm unit of the camera according to the present invention includes a flexible diaphragm member, and can be applied to a diaphragm unit having the advantage of enabling the operation thereof without requiring movement of other frame members.

It should be understood that the present invention is not intended to be limited to the embodiments described above; rather, various changes and modifications may be made without departing from the essence of the present invention. Furthermore, while the above-described embodiments include various aspects of the present invention, various modifications may be made by making various combinations of the aforementioned components disclosed in the above-described embodiments, which are also encompassed in the technical scope of the present invention.

What is claimed is:

1. A camera having a barrier comprising:
   a frame member which is waterproof so as to protect an inside of the frame member from water;
   a driving source stored inside of the frame member;
   an outside transmission member for transmitting a driving force of the driving source to outside of the frame member;
   a through portion which is provided to the frame member and through which the outside transmission member passes through the frame member;
   a seal member for sealing a connection between the through portion and the outside transmission member to waterproof the connection;
   a lens barrier which is provided outside of the frame member, and which is movable between a lens-barrier retracted position at which the lens barrier is retracted from a front of a photographing lens and a protection position at which the lens barrier faces the front of the photographing lens; and
   a driving mechanism which is provided outside of the frame member, and which is operable to drive the lens barrier between the lens-barrier retracted position and the protection position by the driving force of the driving source which is received from the outside transmission member;
   wherein the driving source also drives a lens barrel of the photographing lens to extend toward outside of the camera;
   wherein the photographing lens comprises a zoom lens;
   wherein the outside transmission member comprises a rotary member;
   wherein the through portion comprises an opening;
   wherein the seal member comprises an O-ring;
   wherein the frame member has an opening for extending the lens barrel of the photographing lens toward the outside of the camera; and
   wherein an additional seal member is provided to a connection between the opening and an outer circumferential surface of the lens barrel of the photographing lens so as to waterproof the connection.

2. A camera having a barrier according to claim 1, further comprising an exterior member provided outside of the frame member.

3. A camera having a barrier according to claim 2, wherein the lens barrier is provided in a space between the frame member and the exterior member.

4. A camera having a barrier according to claim 1, wherein the driving source comprises a motor.

5. A camera having a barrier according to claim 1, wherein the driving mechanism includes a lever member, and
   wherein upon receiving rotation force from the outside transmission member, the lever member is rotated, thereby driving the lens barrier.

6. A camera comprising:
   a frame member including a photographing lens therein, the frame member being waterproof so as to protect an inside of the frame member from water;
   a driving source inside of the frame member;
   an outside transmission member for transmitting driving force of the driving source to outside of the frame member;
   a through portion which is provided to the frame member and through which the outside transmission member passes through the frame member;
   a lens barrier which is provided outside of the frame member, and which is movable between a lens barrier retracted position at which the lens barrier is retracted from a front of the photographing lens and a protection position at which the lens barrier faces the front of the photographing lens; and
   a driving mechanism which is provided outside of the frame member, and which is operable to drive the lens barrier between the lens barrier retracted position and the protection position by the driving force of the driving source which is received from the outside transmission member;

wherein the driving source also drives a lens barrel of the photographing lens to extend toward outside of the camera;

wherein the photographing lens comprises a zoom lens;

wherein the outside transmission member comprises a rotary member;

wherein the through portion comprises an opening;

wherein the seal member comprises an O-ring;

wherein the frame member has an opening for extending the lens barrel of the photographing lens toward the outside of the camera; and wherein an additional seal member is provided to a connection between the opening and an outer circumferential surface of the lens barrel of the photographing lens so as to waterproof the connection.

7. A camera according to claim 6, further comprising an exterior member provided outside of the frame member.

8. A camera according to claim 7, wherein the lens barrier is provided in a space between the frame member and the exterior member.

9. A camera according to claim 6, wherein the driving source comprises a motor.

10. A camera according to claim 6, wherein the driving mechanism includes a lever member, and wherein upon receiving rotation of the outside transmission member, the lever member is rotated, thereby driving the lens barrier.

* * * * *

UNITED STATES PATENT AND TRADEMARK OFFICE
CERTIFICATE OF CORRECTION

PATENT NO. : 7,587,134 B2  Page 1 of 1
APPLICATION NO. : 11/285369
DATED : September 8, 2009
INVENTOR(S) : Mochinushi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this

Twenty-first Day of September, 2010

David J. Kappos
*Director of the United States Patent and Trademark Office*